US012748476B2

(12) United States Patent
Rajwan et al.

(10) Patent No.: US 12,748,476 B2
(45) Date of Patent: Sep. 29, 2026

(54) POWER MANAGEMENT IN MULTI-DIE SoCs THROUGH HARDWARE POWER CONTROL

(71) Applicant: Apple Inc., Cupertino, CA (US)

(72) Inventors: Doron Rajwan, Rishon Lezion (IL); Karl D. Wulcan, San Francisco, CA (US); Tal Kuzi, Tel Aviv (IL); Inder M. Sodhi, Palo Alto, CA (US); Achmed R. Zahir, Menlo Park, CA (US); Ilya Granovsky, Kiryat Tivon (IL); Nir Leshem, Beit Yanai (IL); Lior Zimet, Kerem Maharal (IL)

(73) Assignee: Apple Inc., Cupertino, CA (US)

( * ) Notice: Subject to any disclaimer, the term of this patent is extended or adjusted under 35 U.S.C. 154(b) by 225 days.

(21) Appl. No.: 18/622,481

(22) Filed: Mar. 29, 2024

(65) Prior Publication Data

US 2024/0241561 A1 Jul. 18, 2024

Related U.S. Application Data

(63) Continuation of application No. 17/676,665, filed on Feb. 21, 2022, now Pat. No. 11,960,341.

(Continued)

(51) Int. Cl.

*G06F 1/3206* (2019.01)
*G06F 1/3225* (2019.01)

(Continued)

(52) U.S. Cl.

CPC .......... *G06F 1/3206* (2013.01); *G06F 1/3228* (2013.01); *G06F 1/324* (2013.01);

(Continued)

(58) Field of Classification Search

CPC ...... G06F 1/3206; G06F 1/3228; G06F 1/324; G06F 1/3293; G06F 1/3296; G06F 1/3225

(Continued)

(56) References Cited

U.S. PATENT DOCUMENTS 7,076,204 B2 7/2006 Richenstein et al.
8,633,680 B2 1/2014 Zhao et al.

(Continued)

FOREIGN PATENT DOCUMENTS

CN 105308571 A 2/2016
CN 106575144 A 4/2017

(Continued)

OTHER PUBLICATIONS

International Search Report and Written Opinion in PCT Appl. No. PCT/US2022/039136 mailed Nov. 1, 2022, 11 pages.

(Continued)

*Primary Examiner* — Ji H Bae

(74) *Attorney, Agent, or Firm* — Kowert, Hood, Munyon, Rankin & Goetzel, P.C.; Gareth M. Sampson; Dean M. Munyon

(57) ABSTRACT

Various techniques and circuit implementations for power reduction management in integrated circuits are disclosed. Trigger logic circuits and rate control circuits may be implemented in combination with a power management circuit to control power provided to components of the integrated circuits. Power may be controlled based on receiving trigger signals from a power management unit. The power management circuit may implement power budgets for various components in the integrated circuits.

20 Claims, 14 Drawing Sheets

Related U.S. Application Data

(60) Provisional application No. 63/239,264, filed on Aug. 31, 2021.

(51) Int. Cl.
*G06F 1/3228* (2019.01)
*G06F 1/324* (2019.01)
*G06F 1/3293* (2019.01)
*G06F 1/3296* (2019.01)

(52) U.S. Cl.
CPC .......... *G06F 1/3293* (2013.01); *G06F 1/3296* (2013.01); *G06F 1/3225* (2013.01)

(58) Field of Classification Search
USPC .......................... 713/300, 320, 322; 711/167
See application file for complete search history.

(56) References Cited

U.S. PATENT DOCUMENTS

| | | | | |
|---|---|---|---|---|
| 8,848,577 | B2 | 9/2014 | Saund et al. | |
| 9,134,779 | B2 * | 9/2015 | Kuesel | G06F 1/26 |
| 9,250,684 | B1 * | 2/2016 | Chen | G06F 1/3206 |
| 9,348,380 | B2 * | 5/2016 | Ping | G06F 3/0625 |
| 9,654,483 | B1 | 5/2017 | Benson et al. | |
| 10,558,589 | B1 | 2/2020 | de Cesare et al. | |
| 11,693,472 | B2 * | 7/2023 | Granovsky | G06F 1/3206 713/322 |
| 11,853,140 | B2 * | 12/2023 | Rajwan | G06F 1/3206 |
| 11,960,341 | B2 * | 4/2024 | Langlinais | G06F 1/3228 |
| 2001/0003207 | A1 * | 6/2001 | Kling | G06F 9/3867 713/320 |
| 2002/0159276 | A1 | 10/2002 | Deboy et al. | |
| 2003/0083024 | A1 | 5/2003 | Richenstein et al. | |
| 2004/0230846 | A1 | 11/2004 | Mancey et al. | |
| 2007/0067656 | A1 | 3/2007 | Ranganathan et al. | |
| 2007/0277049 | A1 | 11/2007 | Hansalia | |
| 2008/0182536 | A1 | 7/2008 | Ku et al. | |
| 2011/0291746 | A1 | 12/2011 | Ibrahim et al. | |
| 2012/0095607 | A1 | 4/2012 | Wells et al. | |
| 2012/0249094 | A1 | 10/2012 | Zhao et al. | |
| 2013/0119959 | A1 | 5/2013 | Bai et al. | |
| 2013/0185581 | A1 | 7/2013 | Michalak et al. | |
| 2014/0067139 | A1 | 3/2014 | Berke et al. | |
| 2014/0086070 | A1 | 3/2014 | Saund et al. | |
| 2014/0208140 | A1 | 7/2014 | Brooks et al. | |
| 2015/0177814 | A1 * | 6/2015 | Bailey | G06F 1/3296 713/320 |
| 2016/0070328 | A1 | 3/2016 | Berke et al. | |
| 2016/0139963 | A1 * | 5/2016 | Folco | G06F 9/5094 718/104 |
| 2017/0278199 | A1 | 9/2017 | Wu et al. | |
| 2017/0351322 | A1 | 12/2017 | Uan-Zo-Li et al. | |
| 2018/0101205 | A1 | 4/2018 | Conroy et al. | |
| 2019/0089414 | A1 | 3/2019 | Gree et al. | |
| 2019/0146569 | A1 | 5/2019 | Nge et al. | |
| 2019/0250577 | A1 | 8/2019 | Wen et al. | |
| 2019/0377395 | A1 | 12/2019 | Kaburlasos et al. | |
| 2019/0377694 | A1 | 12/2019 | Muthukrishnan et al. | |
| 2020/0089308 | A1 | 3/2020 | Dai et al. | |
| 2020/0264692 | A1 | 8/2020 | Gorbatov et al. | |
| 2020/0333867 | A1 * | 10/2020 | Gendler | G06F 1/3287 |
| 2020/0379534 | A1 | 12/2020 | Zahir et al. | |
| 2021/0109578 | A1 | 4/2021 | Umapathy et al. | |
| 2021/0232206 | A1 | 7/2021 | Matula et al. | |
| 2022/0261056 | A1 | 8/2022 | Motoi et al. | |
| 2022/0365586 | A1 | 11/2022 | Kim et al. | |
| 2023/0054476 | A1 | 2/2023 | Ellis et al. | |

FOREIGN PATENT DOCUMENTS

| | | | |
|---|---|---|---|
| CN | 106575145 | A | 4/2017 |
| CN | 107851042 | A | 3/2018 |
| CN | 110383661 | A | 10/2019 |
| CN | 110442216 | A | 11/2019 |
| CN | 111316234 | A | 6/2020 |
| EP | 2100206 | B1 | 8/2014 |
| KR | 10-2016-0059430 | A | 5/2016 |
| KR | 10-2019-0109408 | A | 9/2019 |
| KR | 10-2021-0050489 | A | 5/2021 |
| TW | 201508466 | A | 3/2015 |
| TW | 201508480 | A | 3/2015 |
| TW | 201541234 | A | 11/2015 |
| TW | 201828565 | A | 8/2018 |
| TW | 201837653 | A | 10/2018 |
| TW | 201913290 | A | 4/2019 |
| TW | 202113604 | A | 4/2021 |

OTHER PUBLICATIONS

Notice of Allowance in U.S. Appl. No. 17/676,668 mailed Feb. 14, 2023, 8 pages.
Office Action in U.S. Appl. No. 17/676,683 mailed May 2, 2023, 12 pages.
Office Action in Taiwanese Appl. No. 111132676 mailed May 17, 2023, 5 pages.
Office Action in Taiwanese Appl. No. 113107386 mailed Mar. 20, 2024, 3 pages.
Office Action in KR Appl. No. 10-2024-7006762 mailed May 17, 2024, 9 pages.
Office Action in Chinese Appl. No. 202280058308.4 mailed Dec. 6, 2024, 4 pages.
Office Action in Taiwanese Appl. No. 113121112 mailed Jun. 28, 2024, 3 pages.

* cited by examiner

1200

POWER MANAGEMENT IN MULTI-DIE SoCs THROUGH HARDWARE POWER CONTROL

PRIORITY CLAIM

The present application is a continuation of U.S. patent application Ser. No. 17/676,665, entitled “Power Delivery Reduction Scheme for SoC,” filed Feb. 21, 2022, which claims priority to U.S. Provisional Patent Application No. 63/239,264, entitled “Power Management in SoCs,” filed Aug. 31, 2021; the disclosures of each of the above-referenced applications are incorporated by reference herein in their entireties.

BACKGROUND

Technical Field

Embodiments described herein are related to power management in an integrated circuit and, more particularly, to various hardware circuits for controlling power delivery to the integrated circuit.

BRIEF DESCRIPTION OF THE DRAWINGS

Features and advantages of the methods and apparatus of the embodiments described in this disclosure will be more fully appreciated by reference to the following detailed description of presently preferred but nonetheless illustrative embodiments in accordance with the embodiments described in this disclosure when taken in conjunction with the accompanying drawings in which.

In the following description, numerous specific details are set forth to provide a thorough understanding of the disclosed embodiments. One having ordinary skill in the art, however, should recognize that aspects of disclosed embodiments might be practiced without these specific details. In some instances, well-known circuits, structures, signals, computer program instruction, and techniques have not been shown in detail to avoid obscuring the disclosed embodiments.

DETAILED DESCRIPTION OF EMBODIMENTS

Figure 1:
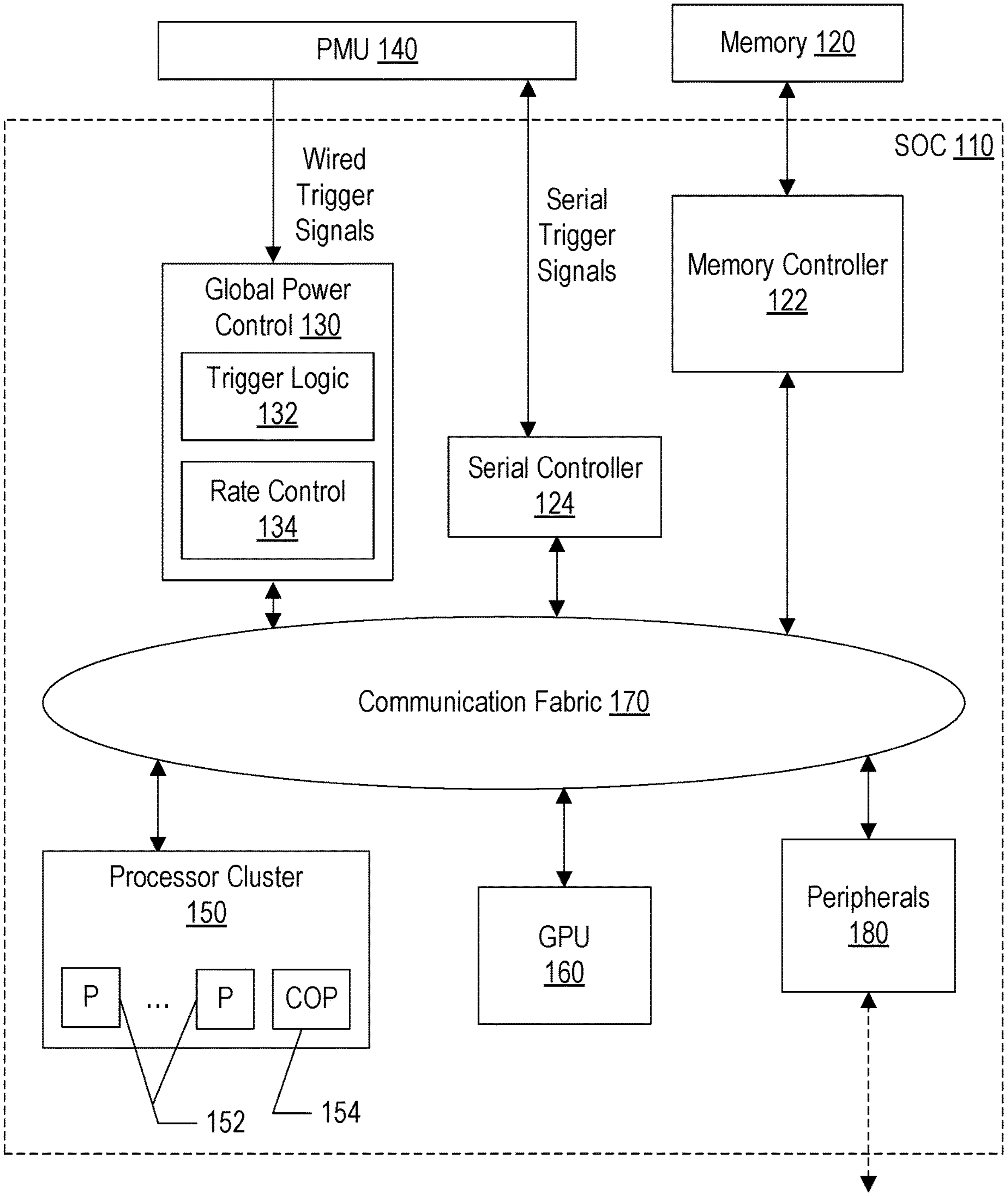
FIG. 1 is a block diagram of one embodiment of a system that includes a system on a chip (SOC) coupled to a memory and a power management unit (PMU).

FIG. 1 is a block diagram of one embodiment of a system that includes a system on a chip (SOC) 110 coupled to a memory 120 and a power management unit (PMU) 140. The PMU 140 may be configured to supply power to the SOC 110 and other components that may be included in the system, such as the memory 120. For example, the PMU 140 may be configured to generate one or more supply voltages to power the SOC 110, and may further be configured to generate supply voltages for other components of the system, not shown in FIG. 1. Additionally, the PMU 140 (or companion circuitry coupled to the PMU 140) may be configured to monitor the supply voltages and detect transient undervoltage conditions, overcurrent conditions, power limit conditions, temperature conditions, or other conditions that could cause erroneous operation in the SOC 110. When such conditions occur (e.g., the electrical load of the SOC 110 exceeding the capacity of the PMU 140), the PMU 140 may assert a trigger output signal to the SOC 110. As an example, for power limit conditions, power may be averaged over different time-constants with different power limits for different time-constants (for instance, short averaging time-constants may have higher limits than longer time averaging time-constants) and the trigger may be asserted based on exceeding any of the power limits for the different time-constants. In some embodiments, a power limit may be applied using a current-square (12) RMS constraint.

In various embodiments, the trigger output signal may be communicated to SOC 110 via a wired transmission (e.g., a hardwired interface between two components) or a serial communication interface (e.g., a two-way communication interface). Wired trigger signal transmissions may be provided to a global power control circuit 130 incorporated into the SOC 110 may receive the trigger input while serial trigger signal transmissions may be provided directly to processor engines (such as processor cluster 150, GPU 160, or peripherals 180) via serial controller 124 and/or communication fabric 170. Serial controller 124 may be a system power management interface (SPMI) that provides two-way communication between the processor engines and PMU 140. While serial controller 124 is shown communicating with the processor engines through communication fabric 170 in FIG. 1, in various embodiments, serial controller 124 may communicate directly with one or more of the processor engines. Wired trigger signal transmissions and serial trigger signal transmissions are discussed in more detail below with respect to the embodiment of PMU 140 depicted in FIG. 2. While an SOC embodiment is used as an example herein, systems comprising multiple integrated circuits coupled to a communication fabric may be used in other embodiments.

As implied by the name, the components of the SOC 110 may be integrated onto a single semiconductor substrate as an integrated circuit “chip.” In the illustrated embodiment, the components of the SOC 110 include at least one processor cluster 150, at least one graphics processing unit (GPU) 160, one or more peripheral components such as peripheral components 180 (more briefly, “peripherals”), at least one memory controller 122, a global power control circuit 130, and a communication fabric 170. The components 150, 160, 180, 122, and 130 may all be coupled to the communication fabric 170. The memory controller 122 may be coupled to the memory 120 during use. In some embodiments, there may be more than one memory controller coupled to a corresponding memory. The memory address space may be mapped across the memory controllers in any desired fashion in such embodiments. In the illustrated embodiment, the processor cluster 150 may include a plurality of processors (P) 152. The processors 152 may form the central processing units (CPU(s)) of the SOC 110. The processor cluster 150 may further include one or more coprocessors (e.g., the coprocessor 154 in FIG. 1) that may be optimized for a subset of the processor instruction set and may be used by the processors 152 to execute instructions in the subset. For example, the coprocessor 154 may be a matrix engine optimized to perform vector and matrix operations.

As described above, processor cluster 150 may include one or more processors 152 that may serve as the CPU of the SOC 110. The CPU of the system includes the processor(s) that execute(s) the main control software of the system, such as an operating system. Generally, software executed by the CPU during use may control the other components of the system to realize the desired functionality of the system. The processors may also execute other software, such as application programs. The application programs may provide user functionality, and may rely on the operating system for lower-level device control, scheduling, memory management, etc. Accordingly, the processors may also be referred to as application processors.

Generally, a processor may include any circuitry and/or microcode configured to execute instructions defined in an instruction set architecture implemented by the processor. Processors may encompass processor cores implemented on an integrated circuit with other components as a system on a chip (SOC 110) or other levels of integration. Processors may further encompass discrete microprocessors, processor cores and/or microprocessors integrated into multichip module implementations, processors implemented as multiple integrated circuits, etc.

The memory controller 122 may generally include the circuitry for receiving memory operations from the other components of the SOC 110 and for accessing the memory 120 to complete the memory operations. The memory controller 122 may be configured to access any type of memory 120. For example, the memory 120 may be static random-access memory (SRAM), dynamic RAM (DRAM) such as synchronous DRAM (SDRAM) including double data rate (DDR, DDR2, DDR3, DDR4, etc.) DRAM. Low power/mobile versions of the DDR DRAM may be supported (e.g., LPDDR, mDDR, etc.). The memory controller 122 may include queues for memory operations, for ordering (and potentially reordering) the operations and presenting the operations to the memory 120. The memory controller 122 may further include data buffers to store write data awaiting write to memory and read data awaiting return to the source of the memory operation. In some embodiments, the memory controller 122 may include a memory cache to store recently accessed memory data. In SOC implementations, for example, the memory cache may reduce power consumption in the SOC by avoiding reaccess of data from the memory 120 if it is expected to be accessed again soon. In some cases, the memory cache may also be referred to as a system cache, as opposed to private caches such as the L2 cache or caches in the processors, which serve only certain components. Additionally, in some embodiments, a system cache need not be located within the memory controller 122.

The peripherals 180 may be any set of additional hardware functionality included in the SOC 110. For example, the peripherals 180 may include video peripherals such as an image signal processor configured to process image capture data from a camera or other image sensor, video encoder/decoders, scalers, rotators, blenders, display controller, etc. The peripherals may include audio peripherals such as microphones, speakers, interfaces to microphones and speakers, audio processors, digital signal processors, mixers, etc. The peripherals may include interface controllers for various interfaces external to the SOC 110 including interfaces such as Universal Serial Bus (USB), peripheral component interconnect (PCI) including PCI Express (PCIe), serial and parallel ports, etc. The interconnection to external device is illustrated by the dashed arrow in FIG. 1 that extends external to the SOC 110. The peripherals may include networking peripherals such as media access controllers (MACs). Any set of hardware may be included.

The communication fabric 170 may be any communication interconnect and protocol for communicating among the components of the SOC 110. The communication fabric 170 may be bus-based, including shared bus configurations, cross bar configurations, and hierarchical buses with bridges. The communication fabric 170 may also be packet-based, and may be hierarchical with bridges, cross bar, point-to-point, or other interconnects.

It is noted that the number of components of the SOC 110 (and the number of subcomponents for those shown in FIG. 1, such as the processors 152 in each processor cluster 150 may vary from embodiment to embodiment. Additionally, the number of processors 152 in one processor cluster 150 may differ from the number of processors 152 in another processor cluster 150 when multiple processor clusters are included. There may be more or fewer of each component/subcomponent than the number shown in FIG. 1.

Figure 2:
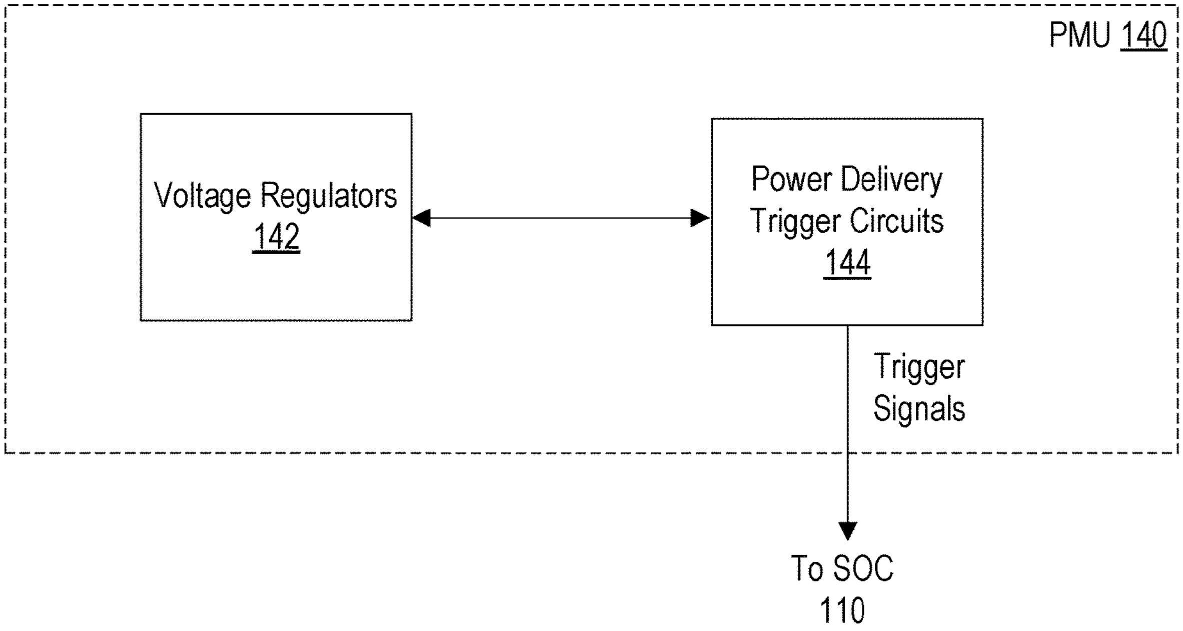
FIG. 2 is a block diagram of one embodiment of a PMU.

As described herein, the PMU 140 may be configured to assert one or more trigger signals when various conditions that could cause erroneous operation in the SOC 110 are detected. FIG. 2 is a block diagram of one embodiment of PMU 140. In the illustrated embodiment, PMU 140 includes voltage regulators 142 and power delivery trigger circuits 144. In certain embodiments, power delivery trigger circuits 144 are configured to monitor the supply voltages in voltage regulators 142 and provide trigger signal(s) when transient undervoltage conditions are detected in the voltage regulators. For instance, a power delivery trigger circuit 144 may provide a trigger signal when the supply voltage provided by a voltage regulator 142 falls below a threshold (e.g., an undervoltage threshold).

Figure 3:
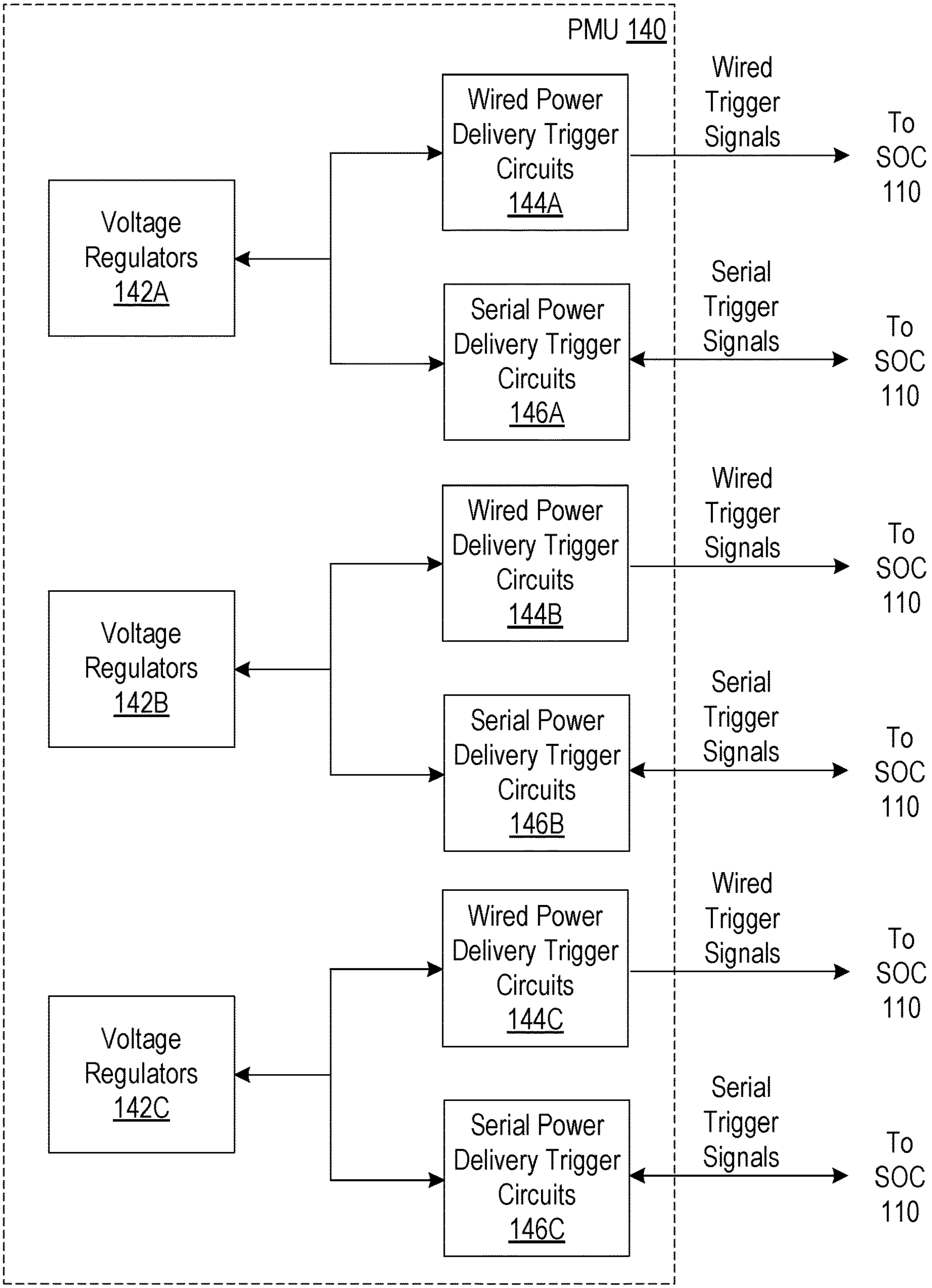
FIG. 3 is a block diagram of another embodiment of a PMU.

FIG. 3 is a block diagram of another embodiment of PMU 140. In the illustrated embodiment, PMU 140 includes voltage regulators 142, wired power delivery trigger circuits 144, and serial power delivery trigger circuits 146. As shown in FIG. 3, PMU 140 may include multiple voltage regulators 142 (e.g., voltage regulators 142A, 142B, 142C) connected to multiple sets of power delivery trigger circuits (e.g., wired power delivery trigger circuits 144A, 144B, 144C and serial power delivery trigger circuits 146A, 146B, 146C). Any number of voltage regulators 142, wired power delivery trigger circuits 144, and serial power delivery trigger circuits 146 may be contemplated in PMU 140. Voltage regulators 142A, 142B, 142C may represent different voltage regulators providing different supply voltages to different portions of SOC 110. For instance, voltage regulators 142A may provide a supply voltage to processor cluster 150 while voltage regulators 142B provide a supply voltage to GPU 160. In various embodiments, voltage regulators 142A, 142B, 142C may be part of a hierarchical power delivery system (e.g., hierarchical power delivery system 900 described in FIG. 9).

As described above, wired power delivery trigger circuits 144 may be directly wired to SOC 110 (e.g., global power control circuit 130 in the SOC 110) while serial power delivery trigger circuits 146 may be coupled to SOC 110 (e.g., communication fabric 170 in the SOC 110) via serial communication interfaces (e.g., SPMIs). In various embodiments, serial power delivery trigger circuits 146 includes SPMIs for communication with SOC 110 (e.g., via serial controller 124). Accordingly, serial power delivery trigger circuits 146 may be capable of two-way communication with SOC 110 while wired power delivery trigger circuits 144 provide one-way communication from the wired power delivery trigger circuits 144 to the SOC 110.

In certain embodiments, wired power delivery trigger circuits 144 and serial power delivery trigger circuits 146 are configured to monitor one or more conditions (e.g., voltage, current, or temperature) in voltage regulators 142 and provide trigger signal(s) when the conditions exceed various thresholds as determined by the power delivery trigger circuits. Various embodiments of fast (on the order of nanoseconds) and slow (on the order of microseconds or milliseconds) responses may be implemented in either wired power delivery trigger circuits 144 or serial power delivery trigger circuits 146. In certain embodiments, fast responses are implemented in wired power delivery trigger circuits 144 to take advantage of the high transmission speed of a wired connection. Conversely, slow responses may be implemented in serial power delivery trigger circuits 146 as serial connections provide signal transmission speeds on the order the slow responses.

In various embodiments, serial connections between serial power delivery trigger circuits 146 and SOC 110 allow for querying of conditions by the SOC 110. For example, SOC 110 may provide a request for condition information when operation of the SOC 110 changes or another event has occurred. SOC 110 may provide the request query through the serial communication interface to a serial power delivery trigger circuit 146. The serial power delivery trigger circuit 146 may then provide a condition status (such as a condition value being above or below a threshold) via the trigger signal output back to the SOC 110 through the serial communication interface.

In some embodiments, a trigger signal is provided when the electrical load experienced in a voltage regulator 142 exceeds a threshold (e.g., the voltage falls below an undervoltage threshold). Voltage threshold comparisons may be implemented, for example, using voltage sensing elements such as voltage-based comparator circuits. Voltage-based comparator circuits may be fast response circuits generally used in wired power delivery trigger circuits 144. In some embodiments, a trigger signal is provided when the current experienced in a voltage regulator 142 exceeds a current threshold (e.g., when the current goes above a predefined current limit). Current threshold comparisons may be implemented by output current comparator circuits (e.g., current sensing elements), which may be fast response circuits used in, for example, wired power delivery trigger circuits 144. In some contemplated embodiments, current sensing capability is implemented to monitor current conditions (e.g., determine whether a current exceeds an overcurrent threshold). Current sensing capability may include, for example, a filtered current sensing capability, which may be implemented in a slow response serial power delivery trigger circuit 146. In some embodiments, a trigger signal is provided when the temperature experienced in a voltage regulator 142 exceeds a predefined temperature in order to prevent overtemperature in PMU 140. Temperature sensing is typically a slow response to a serial power delivery trigger circuit 146 may be implemented in a temperature sensing scheme.

The above description provides example embodiments of various responses schemes for different conditions are described here. It should be understood, however, that the locations and numbers of response schemes may be varied between voltage regulators 142, wired power delivery trigger circuits 144, and serial power delivery trigger circuits 146 for desired operations of PMU 140 and SOC 110. For instance, in various embodiments, a wired power delivery trigger circuit 144 and a serial power delivery trigger circuit 146 may both be implemented to monitor similar operating conditions (e.g., voltage or current) in the same voltage regulator 142. In such embodiments, the wired power delivery trigger circuit 144 provides a fast response time while the serial power delivery trigger circuit 146 provides a slower response.

In certain embodiments, the wired power delivery trigger circuit 144 and the serial power delivery trigger circuit 146 are able to provide different capabilities in power management based on the different response times and where the trigger signals are sent in SOC 110. As an example, as shown in FIGS. 1 and 3, the wired power delivery trigger circuit 144 provides the wired trigger signal to global power control circuit 130 while the serial power delivery trigger circuit 146 provides the serial trigger signal to communication fabric 170 and then to components such as processor cluster 150 or GPU 160. As described herein, global power control circuit 130 is able to provide fast response and fast clock rate control in order to prevent functional failures in SOC 110 or PMU 140. The serial trigger signal provided by the serial power delivery trigger circuit 146 may, however, be implemented by components in SOC 110 (e.g., processor cluster 150 or GPU 160) to determine more precise control for operation of SOC 110 (e.g., by using dynamic voltage and frequency control in components of SOC 110).

Accordingly, in certain embodiments, the thresholds for wired power delivery trigger circuits 144 are closer to a functional failure point of SOC 110 or PMU 140 than the thresholds for serial power delivery trigger circuits 146. The thresholds for wired power delivery trigger circuits 144 may be closer to the functional failure point of SOC 110 or PMU 140 in order to provide fast response when operating conditions possibly threaten failure in functionality of the SOC 110 or the PMU 140. Slower response may, contrarily, be more suitable when the SOC 110 or PMU 140 are further from the functional failure point. As an example, a voltage threshold for a wired power delivery trigger circuit 144 may be closer to an undervoltage that causes functional failure in SOC 110 or PMU 140 than a voltage threshold for a serial power delivery trigger circuit 146 (e.g., the wired voltage threshold is lower than the serial voltage threshold). Thus, if the voltage begins to drop slowly, the serial voltage threshold will be crossed first and SOC 110 may respond to a serial trigger signal from the serial power delivery trigger circuit 146, potentially before the wired voltage threshold is reached. If, however, the voltage is quickly dropping, even though the wired voltage threshold is reached after the serial voltage threshold, the fast response provided by the wired power delivery trigger circuit 144 and global power control circuit 130 may occur before the SOC 110 has a chance to respond to the serial trigger signal. Response to the wired signal may be preserve functionality until a later serial trigger signal read is performed and SOC 110 reacts to it. Such a hierarchical response scheme may provide improved performance of SOC 110 and PMU 140 while preventing functional failures in the devices.

In some embodiments, a response scheme is hierarchical based on hierarchy in the power delivery system (e.g., a hierarchy between voltage regulators 142A, 142B, 142C). For instance, voltage regulators 142A may have a higher hierarchy than voltage regulators 142B. Accordingly, trigger signals from wired power delivery trigger circuits 144A or serial power delivery trigger circuits 146A may have higher hierarchy (e.g., higher priority) in determining power reduction than wired power delivery trigger circuits 144B or serial power delivery trigger circuits 146B. Additionally, in hierarchical power delivery systems, a power reduction response (e.g., power reduction of a component or a power supply) may be triggered in one component by a trigger signal for another component. For example, a trigger signal from wired power delivery trigger circuits 144B or serial power delivery trigger circuits 146B may trigger a power reduction in voltage regulators 142A.

In various embodiments, one or more of voltage regulators 142 are coupled to a battery (or other power supply unit) to provide power to SOC 110. In some embodiments, one or more of wired power delivery trigger circuits 144 or serial power delivery trigger circuits 146 are configured to monitor voltage in the battery. Direct monitoring of voltage in the battery may help prevent brownouts in SOC 110 due to low battery charge states.

Turning back to FIG. 1, in various embodiments, global power control circuit 130 receives trigger signal(s) from PMU 140. When an event associated with a trigger signal is occurring, global power control circuit 130 may respond by rapidly reducing the clock frequency at which the components are operating to prevent functional failures in SOC 110 or PMU 140. In accordance with this disclosure, an integrated circuit (e.g., the SOC 110) may comprise a plurality of components (e.g., processor cluster 150, GPU 160, peripherals 180) and global power control circuit 130 coupled to the plurality of components (via communication fabric 170).

Figure 4:
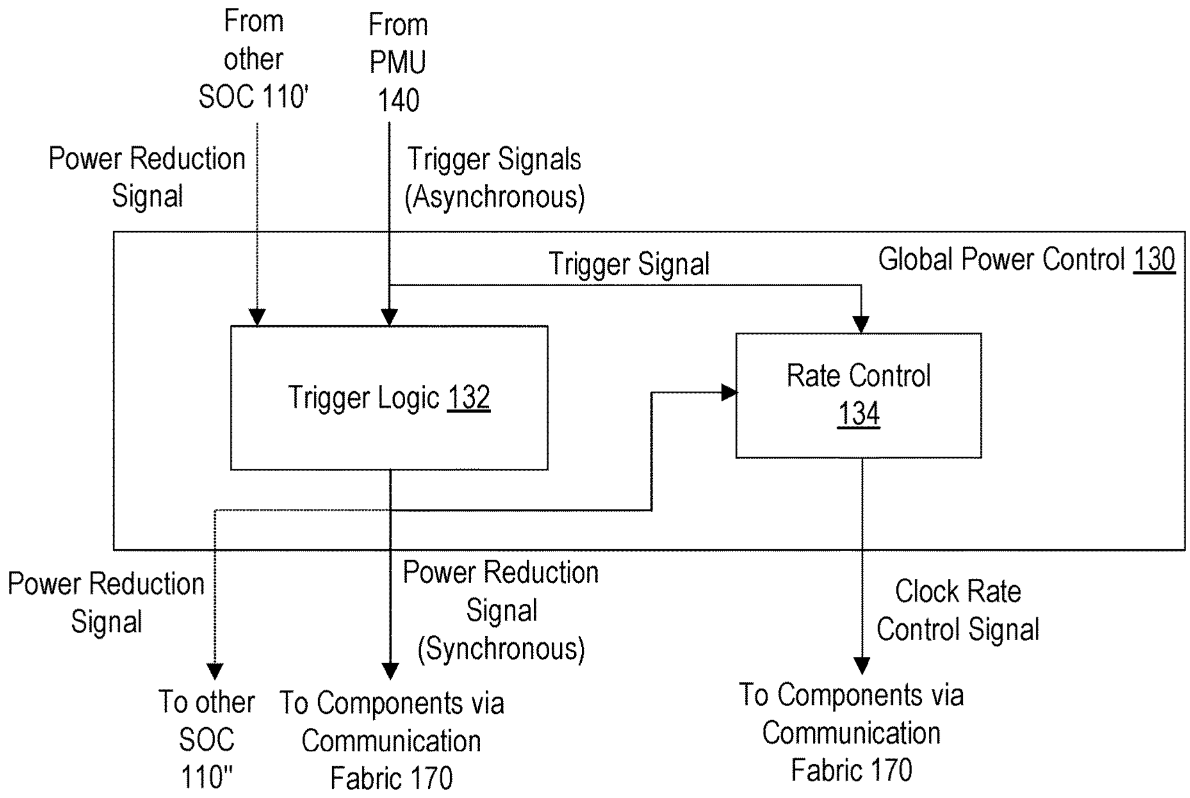
FIG. 4 is a block diagram of one embodiment of a global power control circuit.

FIG. 4 is a block diagram of one embodiment of global power control circuit 130. In the illustrated embodiment, global power control circuit 130 includes trigger logic circuit 132 and rate control circuit 134. Global power control circuit 130 receives trigger signal(s) from PMU 140. In certain embodiments, the trigger signals are asynchronous trigger signals with respect to a clock cycle of SOC 110. For instance, a trigger signal may be received by global power control circuit 130 at any time during a clock cycle of SOC 110.

In various embodiments, trigger logic circuit 132 receives a trigger signal from PMU 140 and determines a power reduction signal based on the received trigger signal. The power reduction signal may be, for example, a synchronous signal provided at the clock rate of SOC 110 to one or more components in the SOC 110. The one or more components may then implement power reduction or metrics based on the received power reduction signal. In various embodiments, trigger logic circuit 132 includes a combination of enables, hysteresis, and synchronizers to convert an asynchronous trigger signal into a synchronous power reduction signal.

Examples of techniques implemented by trigger logic circuit 132 to provide the power reduction signal include clock dithering, clock gating, selective pulse removal, clock division, etc. These techniques may be effective at continuing operation of SOC 110 without error because the reduced frequency of the clock offsets the more slowly evaluating transistors at the lowered voltage. For example, dividing the clock frequency by 2 (a relatively quick operation) reduces performance by approximately ½. In some cases, performance reduction may be even greater to assure error-free operation, e.g., 75% or greater. The global power control circuit 130 may thus be coupled to the various components of the SOC 110 (such as processors 152 or GPU 160) or may at least be coupled to the clock resources of the various components (e.g., phase lock loops (PLLs), delay lock loops (DLLs), clock dividers, clock gaters, clock trees, etc.) to implement the frequency reductions that may help ensure error-free operation (or correct operation) during the undervoltage operations.

While trigger logic circuit 132 provides relatively fast power reduction response to trigger signal from PMU 140, faster response times for reducing the clock frequency may be needed in various embodiments of SOC 110. For instance, in embodiments where SOC 110 is a multi-die SOC (e.g., the SOC 110 has multiple chips operating as a single chip), faster response times to reduce the clock frequency may be needed to prevent functional failures as it may be possible that the large number of parallel transactions can overrun PMU 140.

In various embodiments, rate control circuit 134 in global power control circuit 130 implements faster response times to trigger signals received by the global power control circuit. Rate control circuit 134 may include, for example, fabric or other logic to control a clock rate in SOC 110 based on a received trigger signal. For instance, rate control circuit 134 may decrease a frequency of a clock in communication fabric 170 rapidly in response to receiving the trigger signal. As shown in FIG. 4, rate control circuit 134 may receive a selected trigger signal from PMU 140. In certain embodiments, the selected trigger signal is provided to rate control circuit 134 using wiring in place between a selected power delivery trigger circuit 144 (shown in FIGS. 2 and 3) and the rate control circuit. For instance, wiring to rate control circuit 134 can be branched off from wiring between the selected power delivery trigger circuit 144 and trigger logic circuit 132. Accordingly, rate control circuit 134 can receive the selected trigger signal asynchronously from the selected power delivery circuit 144. In one contemplated embodiment, the selected trigger signal is received from one or more voltage regulators 142 in PMU 140 that supply power to communication fabric 170.

In certain embodiments, rate control circuit 134 controls a clock rate of SOC 110 or one or more components of the SOC 110 based on receiving the selected trigger signal. For example, rate control circuit 134 may reduce the clock rate based on receiving the selected trigger signal. Since the selected trigger signal is received asynchronously (from a clock cycle of SOC 110), rate control circuit 134 is able to reduce the clock rate asynchronously and not wait for another clock cycle before reducing power in the SOC 110. Reducing the clock rate may reduce power consumption in SOC 110, thereby preventing functional failures in PMU 140 or SOC 110. Rate control circuit 134 provides a fast, asynchronous response time for reducing the clock rate when receiving a trigger signal (e.g., within a few nanoseconds). The response times provided by rate control circuit 134 are orders of magnitude faster than response times for power control using dynamic voltage and frequency control in components of SOC 110 (e.g., the time window for response by rate control circuit 134 is orders of magnitude less than the time window for response by components of SOC 110). Such a fast response time may improve the protections against functional failure in power management for multi-die SOC systems.

In some embodiments, as shown in FIG. 4, rate control circuit 134 receives a power reduction signal from trigger logic 132. For example, in one contemplated embodiment, rate control circuit 134 may receive a power reduction signal intended for a CPU (processor 152) in SOC 110. As described above, the power reduction signal is synchronous to the clock cycle of SOC 110. Accordingly, rate control circuit 134 may implement slower, but synchronous, reduction of the clock rate based on the power reduction signal. Providing both the selected trigger signal and the power reduction signal into rate control circuit 134 may, however, provide a redundant power reduction response in SOC 110 to prevent functional failures in PMU 140 or SOC 110.

In some embodiments, as shown in FIG. 4, trigger logic 132 may receive a power reduction signal from another SOC 110' (e.g., another chip or die) being managed by PMU 140. Trigger logic 132 may implement the power reduction signal from SOC 110' to provide a power reduction signal to components in SOC 110. In some embodiments, trigger logic 132 may provide a power reduction to another SOC 110" being managed by PMU 140. The other SOC 110" may then implement power reduction schemes (e.g., using trigger logic circuits in the SOC 110") to reduce power according to the power reduction signal received. The implementation of providing/receiving power reduction signals from other SOCs allows trigger logic 132 and SOC 110 to be part of a multi-die (e.g., multi-chip) power reduction scheme.

Turning back to FIG. 1, in various embodiments, rate limiting may be provided in SOC through memory controller 122. For example, memory controller 122 may implement monitoring of transaction rates in a pipeline associated with the memory controller and slow down transactions as needed. Slowing down transactions may prevent or reduce power supply droop in PMU 140 caused by many transactions across many sources (e.g., multiple SOCs in a multi-die configuration).

Figure 5:
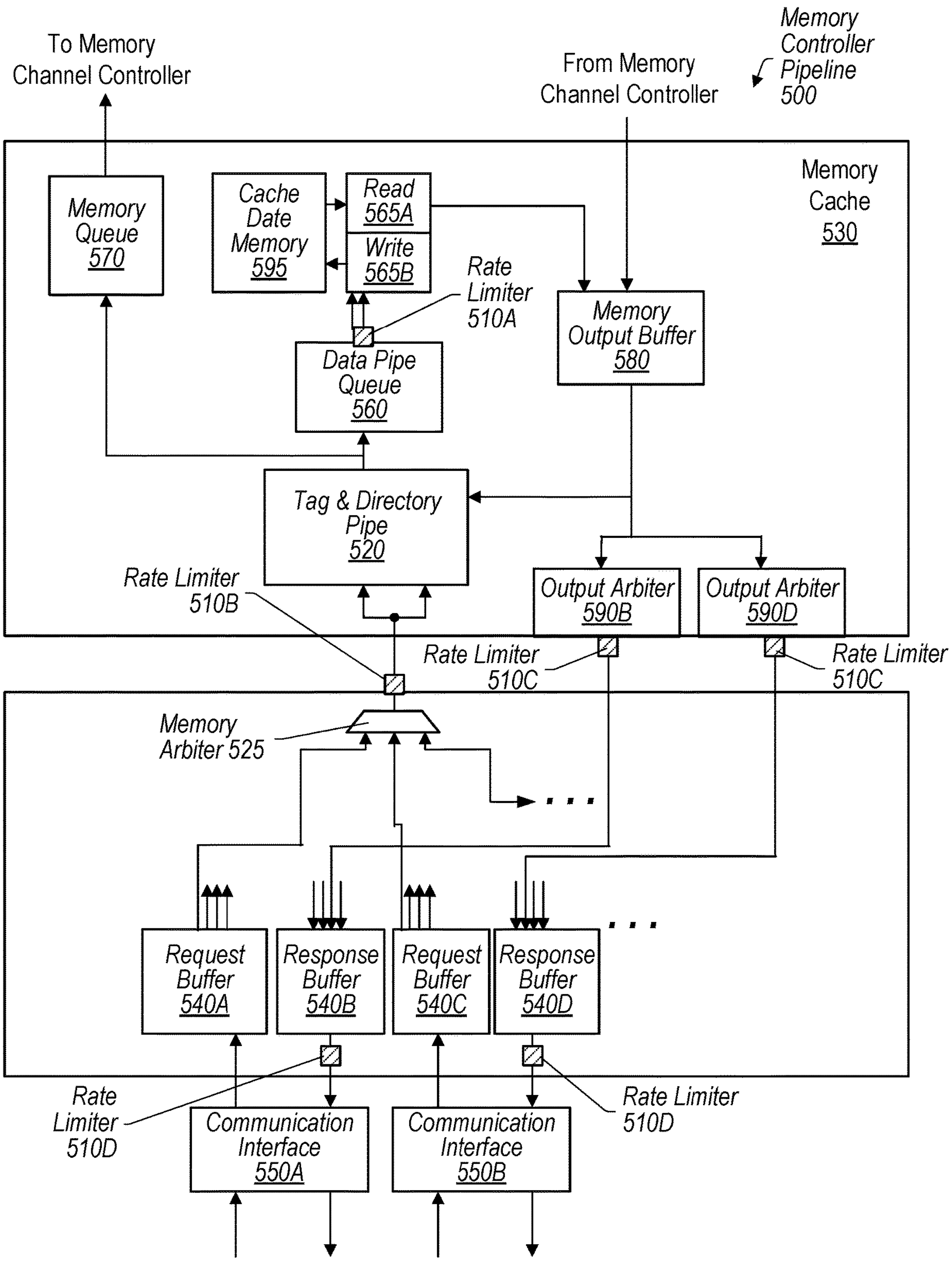
FIG. 5 is a block diagram of one embodiment of a memory controller pipeline.

FIG. 5 is a block diagram of one embodiment of a memory controller pipeline 500. The depiction of pipeline 500 is a simplified block diagram of one embodiment of a memory controller pipeline. It is to be understood that pipeline 500 and the components of the memory controller pipeline may vary beyond the scope of the depiction of FIG. 5 without deviating from scope of the description and claims herein. For instance, additional components or elements may be included in a memory controller pipeline and/or the location of components or elements may vary.

The memory controller pipeline 500 may include a variety of control logic and data structures to queue memory requests, arbitrate among the requests, and transmit the memory requests to a memory cache and ultimately, in the event of a memory cache miss, to the memory 120. Communication interfaces 550A-550B may be a portion of the communication fabric 170, and may supply memory requests from the other components of the SOC 110 to the memory controller 122. The requests may be received into request buffers 540A and 540C, which may track the requests as they flow through the memory controller pipeline 500 and complete by returning data on the communication interfaces 550A-550B (for reads) or updating the memory cache or memory 120 (for writes). The response buffers 540B and 540D may be buffers for read data to be transmitted back to requesting components for read transactions, as well as other responses (e.g., completion response for certain write transactions, and coherency requests for coherent transactions). There may be more request buffers and response buffers for other communication interfaces 550 (not shown in FIG. 5). The request buffers 540A and 540C (and others) may provide inputs into a memory arbiter 525, which may arbitrate requests into a memory cache 530. Requests received by the memory cache 530 may pass through the tag and directory pipe 520, which may include a tag memory for the memory cache (storing address tags identifying cache blocks that are cached in the memory cache 530). In an embodiment, the tag and directory pipe 520 may include a coherency directory that tracks which coherent components in the SOC 110 are caching copies of cache blocks from the memory. The coherency directory and related logic may generate coherency requests, which may be routed out to the components via the response buffers 540B and 540D.

If the request is a hit in the memory cache (e.g., the address matches one of the tags in the tag memory), the tag and directory pipe 520 request may be placed in the data pipe queue 560 to access the cache data memory 595. Read arbiter 565A may arbitrate among read requests in the data pipe queue 560 to read the cache data memory 595, and write arbiter 565B may arbitrate among write requests in the data pipe queue 560 to write the cache data memory 595. Read data from the cache data memory 595 may be provided to a memory output buffer 580. Write responses, for those write requests that use responses, may be placed in the memory output buffer 580 as well.

If a request is a miss in the memory cache (e.g., the address does not match the tags in the tag memory), the tag and directory pipe 520 may place the request in a memory queue 570 to be transmitted to the memory 120. The memory queue 570 may interface to a memory channel controller that accesses the memory 120. Data (for read requests) or optional write completions (for write requests) may later be returned by the memory channel controller to the memory output buffer 580.

Data/write responses from the memory output buffer 580 may be provided to the tag and directory pipe 520 if the data is to be installed in the memory cache 530, and may also be provided to output arbiters 590B, 590D, which may arbitrate to output the data/write response to response buffers 540B, 540D, respectively. The data/write response may subsequently be provided over the communication interfaces 550A-550B to the requesting components.

The memory cache 530 may include multiple sections, or planes, which handle different portions of the memory address space mapped to the memory controller 122. The planes may allow multiple memory requests to proceed in parallel. One plane is illustrated as the memory cache 530 in FIG. 5, but other planes may be similarly configured. There may be a memory arbiter 525 for each plane.

In various embodiments, multiple rate limiters 510 are placed throughout pipeline 500. For example, rate limiters 510 may be placed at various arbitration points within pipeline 500. Examples of locations for rate limiters 510 are shown in FIG. 5. In the illustrated embodiment, rate limiter 510A is placed at a connection between read arbiter 565A or write arbiter 565B and data pipe queue 560, rate limiter 510B is placed at a connection between the tag and directory pipe 520 and memory arbiter 525, rate limiters 510C are placed at connections between output arbiters 590B and 590D and response buffers 540B and 540D, and rate limiters 510D are placed at connections between response buffers 540B and 540D and communication interfaces 550A, 550B.

The numbers and locations (e.g., arbitration points) of rate limiters 510 in pipeline 500 may be varied depending on the control of transaction rates desired in pipeline 500.

Rate limiters 510 may be implemented to proactively cap peak power levels in pipeline 500 in the event of atypical high activity. In various embodiments, rate limiters 510 reduce the flow of commands by inserting bubble (e.g., stalling) cycles at the arbitration points. In certain embodiments, rate limiters 510 are disabled by default but can be configured (e.g., tuned) by the system (e.g., SOC 110 or memory controller 122) to provide desired power consumption ceilings by pipeline 500. For instance, each rate limiter 510 location may have a rate limiter widget associated with it.

Figure 6:
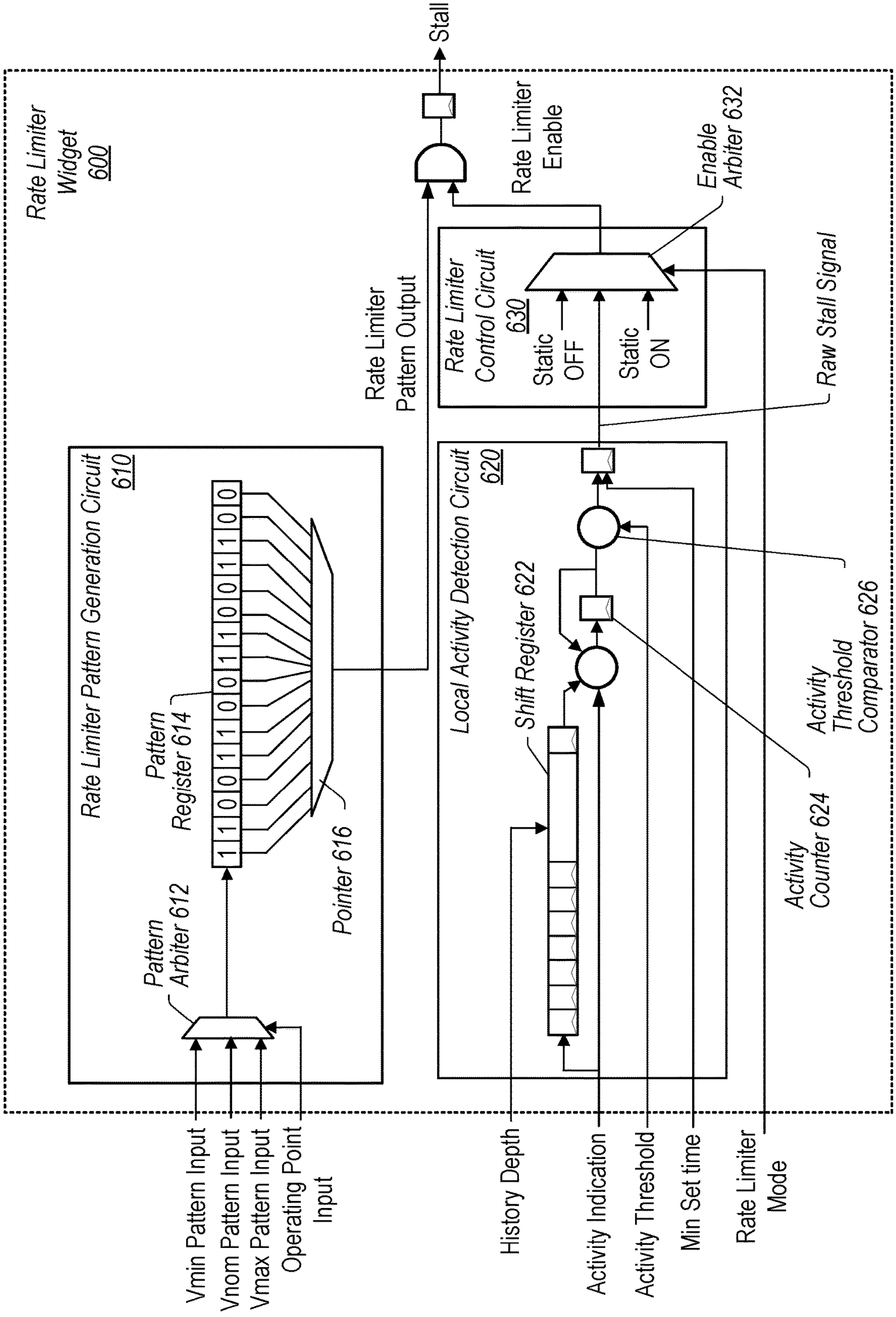
FIG. 6 is a block diagram of one embodiment of a rate limiter widget.

FIG. 6 is a block diagram of one embodiment of rate limiter widget 600. Rate limiter widget 600 may be implemented in any of rate limiters 510, described herein. Rate limiter widget 600 may provide control over operation and generation of stall control signals for the rate limiter 510. In the illustrated embodiment, rate limiter widget 600 includes rate limiter pattern generation 610, local activity detection 620, and rate limiter control 630.

Rate limiter pattern generation 610 may include pattern arbiter 612, pattern register 614, and pointer 616. Rate limiter pattern generation 610 may be programmable using Vmin pattern input, Vnom pattern input, or Vmax pattern input. The rate limiter pattern output may be determined based on operating point input (e.g., memory operating point) provided to pattern arbiter 612. In various embodiments, rate limiter pattern generation 610 determines a rate limiter pattern by cycling through pattern register 614 according to input from pattern arbiter 612. For example, different patterns may be generated for higher performance (higher power) operating points having more cycles of stall than lower performance (lower power) operating points.

In certain embodiments, local activity detection 620 is implemented to track local memory activity. Local activity detection 620 includes shift register 622 that receives history depth input and activity indication input, activity counter 624 that receives activity indication input, and activity threshold comparator 626 for comparing the activity count to an activity threshold. Activity indications may include, for example, local activity indications such as validations for arbiters, pass valid (e.g., tag pipe pass valid), read enable control, write enable control, completion buffer write arbiter grant, completion buffer bypass, and downstream interface arbiter grant.

Shift register 622 may be a configurable register for tracking activity history. For instance, history depth may program shift register to track history for a set amount of cycles (e.g., 32, 16, or 8 cycles) before comparison to the activity threshold is made. Activity counter 624 may count the activity during the set amount of cycles programmed into shift register 622. At that time, the activity amount is compared to the activity threshold in activity threshold comparator 626 to generate a raw stall signal output when the activity is above the predefined activity threshold.

The raw stall signal is provided to rate limiter control 630, which may selectively block or pass the raw stall signal depending on, for example, the programmed rate limiter mode. Enable arbiter 632 may be programmed with the rate limiter mode and make a determination of a mode implemented by rate limiter control 630. One mode may be "static on" where the raw stall signal is passed on and a stall signal is output from rate limiter widget 600 with the rate limiter pattern determined by rate limiter pattern generation 610. Another mode may be "static off" in which the raw stall signal is blocked and no rate limiting occurs. The off mode may be used, for example, if a given memory operating point is known to be low enough power that it isn't a concern for causing PMU voltage droops.

Figure 7:
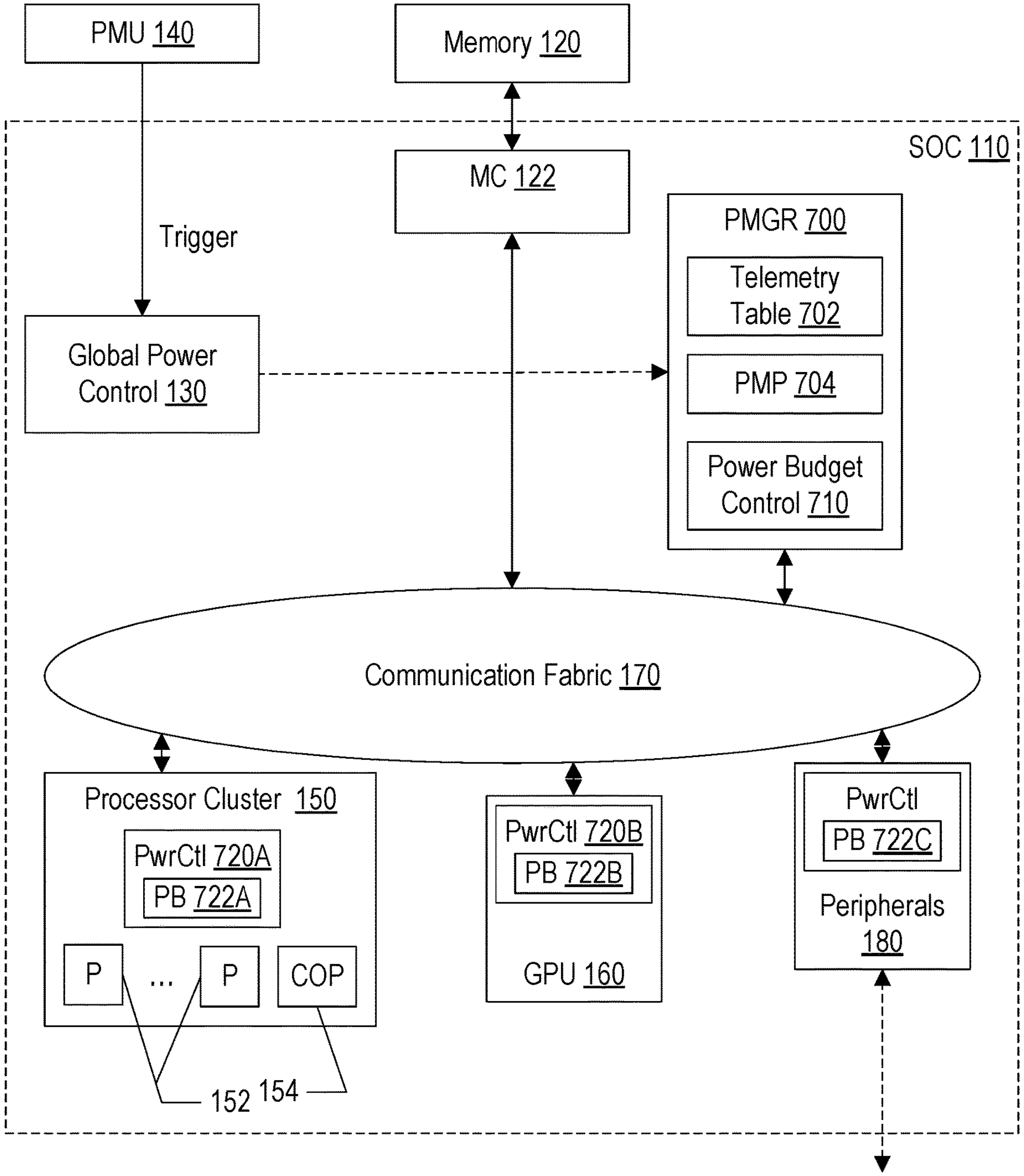
FIG. 7 is a block diagram of another embodiment of a system on a chip (SOC).

Additional embodiments may be contemplated with a power management circuit (PMGR) included in any of the systems described herein. FIG. 7 is a block diagram of one embodiment of a system that includes a system on a chip (SOC) 110 coupled to a memory 120 and a power management unit (PMU) 140. The PMU 140 may be configured to supply power to the SOC 110 and other components that may be included in the system, such as the memory 120. For example, the PMU 140 may be configured to generate one or more supply voltages to power the SOC 110, and may further be configured to generate supply voltages for other components of the system, not shown in FIG. 7. Additionally, the PMU 140 (or companion circuitry coupled to the PMU 140) may be configured to monitor the supply voltages and detect transient undervoltage conditions or other overload conditions that could cause erroneous operation in the SOC 110. When such conditions occur (typically due to the electrical load of the SOC 110 exceeding the capacity of the PMU 140), the PMU 140 may assert a trigger input to the SOC 110. In the illustrated embodiment, a global power control circuit 130 incorporated into the SOC 110 may receive the trigger input. While an SOC embodiment is used as an example herein, systems comprising multiple integrated circuits coupled to a communication fabric may be used in other embodiments.

As implied by the name, the components of the SOC 110 may be integrated onto a single semiconductor substrate as an integrated circuit "chip." In the illustrated embodiment, the components of the SOC 110 include at least one processor cluster 150, at least one graphics processing unit (GPU) 160, one or more peripheral components such as peripheral components 180 (more briefly, "peripherals"), a memory controller 122, a power management circuit (PMGR) 700, the global power control circuit 130, and a communication fabric 170. The components 150, 160, 180, 122, and 700 may all be coupled to the communication fabric 170. The memory controller 122 may be coupled to the memory 120 during use. In some embodiments, there may be more than one memory controller coupled to a corresponding memory. The memory address space may be mapped across the memory controllers in any desired fashion in such embodiments. In the illustrated embodiment, the processor cluster 150 may include a plurality of processors (P) 152. The processors 152 may form the central processing units (CPU(s)) of the SOC 110. The processor cluster 150 may further include one or more coprocessors (e.g., the coprocessor 154 in FIG. 7) that may be optimized for a subset of the processor instruction set and may be used by the processors 152 to execute instructions in the subset. For example, the coprocessor 154 may be a matrix engine optimized to perform vector and matrix operations.

The PMGR 700 may be configured to manage power consumption in the SOC 110. As illustrated in FIG. 7, the PMGR 700 may include a telemetry table 702, a power management processor (PMP) 704, and a power budget control code 710 that may be stored in a memory within the PMGR 700 (e.g., a local memory such as a local static random access memory (SRAM) or read-only memory) and/or in the memory 120. The power budget control code 710 may be stored in a read-only memory or other form of non-volatile memory and may be loaded into the PMGR 700/memory 120 during initialization of the system, for example. The telemetry table 702 may be any type of memory (e.g., static random-access memory (SRAM), registers, etc.). Various components of the SOC 110 may report activity levels, performance information, power consumption data, etc. to the PMGR 700 in a "push" model with some degree of regularity, and thus may be available for analysis in the PMGR 700 instead of requiring the PMGR 700 to poll the various components to collect the information. More particularly, in this embodiment, the PMP 704 may be configured to execute code to analyze the data in the telemetry table, in addition to the power budget control code 710.

As mentioned previously, the PMU 140 may be configured to assert the trigger signal when undervoltage events are detected. When such an event is occurring, the SOC 110 (and more particularly the global power control circuit 130) may respond by rapidly reducing the clock frequency at which the components are operating using techniques such as clock dithering, clock gating, selective pulse removal, clock division, controls within the various components to reduce processing performance and thus reduce power, etc. While these techniques may be effective at continuing operation without error (because the reduced frequency of the clock offsets the more slowly evaluating transistors at the lowered voltage), the performance reduction may be dramatic. For example, dividing the clock frequency by 2 (a relatively quick operation) reduces performance by approximately ½. In some cases, performance reduction may be even greater to assure error-free operation, e.g., 75% or greater. The global power control circuit 130 may thus be coupled to the various components of the SOC 110 (not explicitly depicted in FIG. 7) or may at least be coupled to the clock resources of the various components (e.g., phase lock loops (PLLs), delay lock loops (DLLs), clock dividers, clock gaters, clock trees, etc.) to implement the frequency reductions that may help ensure error-free operation (or correct operation) during the undervoltage operations. In an embodiment, the global power control circuit 130 may be configured to record the frequency (e.g., how often) at which the trigger input is asserted to the global power control circuit 130 in the telemetry table 702 (or the frequency at which the global power control circuit 130 is engaged, which is dependent on the frequency of trigger input assertion), illustrated via the dotted arrow in FIG. 7.

In many cases, a less drastic performance decrease would suffice to reduce the load enough that the undervoltage events would occur less frequently. For example, if an undervoltage event is occurring because the PMU 140 is slightly overloaded, the amount of load reduction that will prevent the event is relatively small and may be achieved by reducing the power consumption of one or more controllable components in the system temporarily, slightly reducing performance but remaining within the capacity of the PMU 140. The PMP 704 and the power budget control code 710 may be employed to attempt to reduce the frequency of undervoltage events, or more particularly to reduce the frequency at which the global power control circuit is invoked to provide undervoltage control. For example, in an embodiment, the power budget control code 710 may analyze the telemetry table data and may determine the frequency of undervoltage events during a given time window, or the amount of time during which the global power control circuit 130 is engaged in reducing power consumption. The power budget control code 710 may modify the power budget to one or more components in the next window of time to attempt to reduce the occurrence of undervoltage events. For example, the power budget may be reduced, and thus the component may consume less power in the next time window, reducing the overall load current on the PMU 140. While the performance that may be achieved by the component may be reduced in the next time window, the reduction in undervoltage events and the severe performance penalties that occur due the undervoltage events may be reduced and overall performance may be higher. For example, the power budget control code 710 may attempt to reduce undervoltage triggers to a specified percentage (e.g., 1% of a given time window). Additional details will be provided further below.

At least some of the components may be configured to control power consumption based on a power budget. For example, the processor cluster 150, the GPU 160, and one or more of the peripherals 180 may include power control circuits (PwrCtl) 720A-720C including respective power budgets 722A-722C. The power control circuits 720A-720C may monitor operation of the respective component and measure/estimate the power consumption. The power control circuits 720A-720C may compare the measured/estimated power consumption against the power budget. If the budget is exhausted or reduced below a threshold, the power control circuit 720A-720C may invoke various power consumption mitigation mechanisms. For example, the power control circuit 720A may employ mitigation mechanisms such as deactivating one or more of the processors 152 and/or deactivating one or more pipelines in a processor 152. Instruction issue rates may be reduced, inserting bubbles in the pipelines so that the corresponding circuitry is not actively evaluating each cycle. Any set of one or more mitigation mechanisms may be used. Similarly, the GPU 160 may reduce the number of active pipelines, limit instruction issue rates, and/or implement any other mitigation mechanisms. The mitigation mechanisms may be specific to the give component being controlled, and different components may employ different mechanisms, or some similar mechanisms and some specific mechanisms, as desired. The PMP 704/power budget control code 710 may be agnostic to the specific mechanisms, setting the budgets 722A-722C and the details of adhering to the budgets 722A-722C are implemented by the power control circuits 720A-720C.

If the power budget control code 710 reduces the power budget 722A-722C in one or more of the power control circuits 720A-720C, and the frequency of undervoltage events is still higher than desired in the next time window, then the power budget 710 may the power budgets further in the following time window. Any algorithms for reduction may be used. For example, each budget may be reduced by a certain amount to effect a reduction, spreading the performance reduction relatively equally over the components that may be controlled. In another algorithm, different budgets 722A-722C may be reduced in different time windows, rotating the reduction among different subsets of one or more components and then returning the reduced power budgets to the original value in a subsequent time window.

It is noted that, while some example embodiments are described as the power budget control being implemented as code 710 executable by the PMP 704, other embodiments may implement all or a portion the power budget control in hardware, e.g., as state machines and/or combinatorial logic.

The PMGR 700 may be configured to control the supply voltage magnitudes requested from the external PMU 140. There may be multiple supply voltages generated by the PMU 140 for the SOC 110. For example, there may be a supply voltage for the processor cluster 150 and at least one supply voltage for the rest of the SOC 110 outside of the processor cluster 150. In an embodiment, the same supply voltage may serve components of the SOC 110 outside of the processor cluster 150 and power gating may be employed to control one or more independent power domains served by the power supply voltage. There may be multiple supply voltages for the rest of the SOC 110, in some embodiments. In some embodiments, there may also be a memory supply voltage for various memory arrays in the processor cluster 150 and/or the SOC 110. The memory supply voltage may be used with the voltage supplied to the logic circuitry, which may have a lower voltage magnitude than that required to ensure robust memory operation. The PMGR 700 may be under direct software control (e.g., software may directly request the power up and/or power down of components) and/or may be configured to monitor the SOC 110 and determine when various components are to be powered up or powered down. Various power states within a component (e.g., power states of the processors 152) may be controlled via the PMGR 700, as well as the sequencing of changes to power states, different request voltage and frequencies, etc.

As mentioned above, the processor cluster 150 may include one or more processors 152 that may serve as the CPU of the SOC 110. The CPU of the system includes the processor(s) that execute the main control software of the system, such as an operating system. Generally, software executed by the CPU during use may control the other components of the system to realize the desired functionality of the system. The processors may also execute other software, such as application programs. The application programs may provide user functionality, and may rely on the operating system for lower-level device control, scheduling, memory management, etc. Accordingly, the processors may also be referred to as application processors.

Generally, a processor may include any circuitry and/or microcode configured to execute instructions defined in an instruction set architecture implemented by the processor. Processors may encompass processor cores implemented on an integrated circuit with other components as a system on a chip (SOC 110) or other levels of integration. Processors may further encompass discrete microprocessors, processor cores and/or microprocessors integrated into multichip module implementations, processors implemented as multiple integrated circuits, etc.

The memory controller 122 may generally include the circuitry for receiving memory operations from the other components of the SOC 110 and for accessing the memory 120 to complete the memory operations. The memory controller 122 may be configured to access any type of memory 120. For example, the memory 120 may be static random-access memory (SRAM), dynamic RAM (DRAM) such as synchronous DRAM (SDRAM) including double data rate (DDR, DDR2, DDR3, DDR4, etc.) DRAM. Low power/mobile versions of the DDR DRAM may be supported (e.g., LPDDR, mDDR, etc.). The memory controller 122 may include queues for memory operations, for ordering (and potentially reordering) the operations and presenting the operations to the memory 120. The memory controller 122 may further include data buffers to store write data awaiting write to memory and read data awaiting return to the source of the memory operation. In some embodiments, the memory controller 122 may include a memory cache to store recently accessed memory data. In SOC implementations, for example, the memory cache may reduce power consumption in the SOC by avoiding reaccess of data from the memory 120 if it is expected to be accessed again soon. In some cases, the memory cache may also be referred to as a system cache, as opposed to private caches such as the L2 cache or caches in the processors, which serve only certain components. Additionally, in some embodiments, a system cache need not be located within the memory controller 122.

The peripherals 180 may be any set of additional hardware functionality included in the SOC 110. For example, the peripherals 180 may include video peripherals such as an image signal processor configured to process image capture data from a camera or other image sensor, video encoder/decoders, scalers, rotators, blenders, display controller, etc. The peripherals may include audio peripherals such as microphones, speakers, interfaces to microphones and speakers, audio processors, digital signal processors, mixers, etc. The peripherals may include interface controllers for various interfaces external to the SOC 110 including interfaces such as Universal Serial Bus (USB), peripheral component interconnect (PCI) including PCI Express (PCIe), serial and parallel ports, etc. The interconnection to external device is illustrated by the dashed arrow in FIG. 7 that extends external to the SOC 110. The peripherals may include networking peripherals such as media access controllers (MACs). Any set of hardware may be included.

The communication fabric 170 may be any communication interconnect and protocol for communicating among the components of the SOC 110. The communication fabric 170 may be bus-based, including shared bus configurations, cross bar configurations, and hierarchical buses with bridges. The communication fabric 170 may also be packet-based, and may be hierarchical with bridges, cross bar, point-to-point, or other interconnects.

It is noted that the number of components of the SOC 110 (and the number of subcomponents for those shown in FIG. 7, such as the processors 152 in each processor cluster 150 may vary from embodiment to embodiment. Additionally, the number of processors 152 in one processor cluster 150 may differ from the number of processors 152 in another processor cluster 150 when multiple processor clusters are included. There may be more or fewer of each component/subcomponent than the number shown in FIG. 7.

In accordance with this disclosure, an integrated circuit (e.g., the SOC 110) may comprise a plurality of components, a global power control circuit coupled to the plurality of components, and a power management circuit. A given component of the plurality of components is configured to manage power consumption based on a budgeted amount assigned to the given component. The global power control circuit is configured to apply power control across the plurality of components responsive to a trigger input to the integrated circuit. The power management circuit is configured to: detect whether or not the power control applied by the global power control circuit exceeds a threshold; and reduce the budgeted amount assigned to at least one of the plurality of components based on a detection that the power control applied by the global power control circuit exceeded the threshold. For example, the threshold may comprise a percentage of time that the power control is applied by the global power control circuit.

The power management circuit may be configured to measure the percentage of time within a fixed time window. For example, the power management circuit may be configured to detect the percentage during a first instance of the fixed time window and may be configured to reduce the budget amount for a next instance of the fixed time window, wherein the next instance is consecutive to the first instance. For example, the power management circuit may be configured to reduce the budget amount to a first component of the plurality of components in a given fixed time window, and to reduce the budget amount to a second component of the plurality of components in another given fixed time window.

Figure 8:
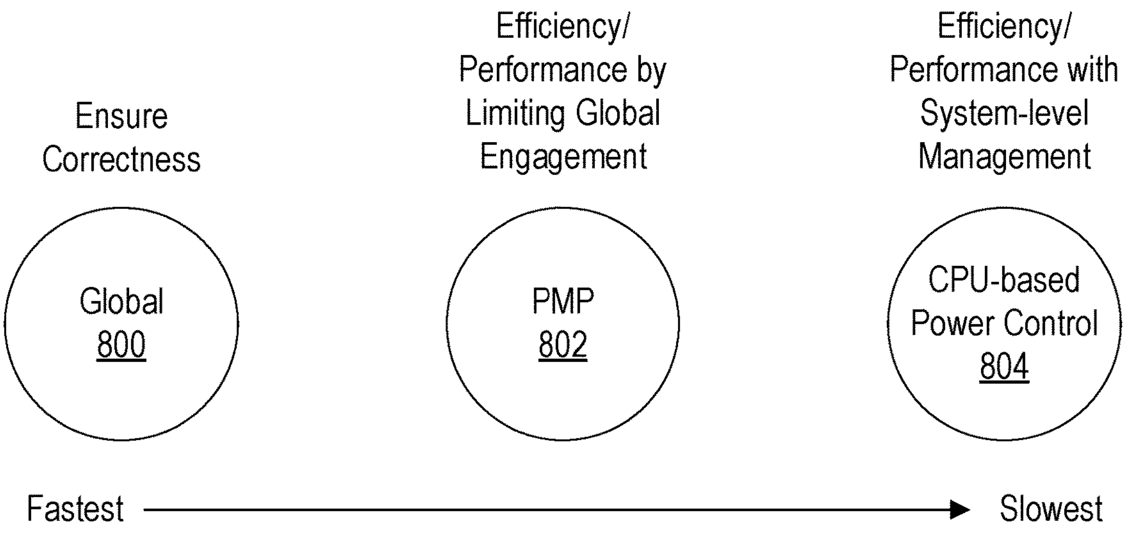
FIG. 8 is a block diagram of one embodiment of power management mechanisms.

FIG. 8 is a block diagram illustrating various power management mechanisms in one embodiment of the SOC 110. The mechanisms are ordered from left to right in FIG. 8 based on how quickly the mechanisms may respond to a need to manage power. On the left is the global power management mechanism (reference numeral 800), operating based on the trigger input to rapidly reduce the clock frequency. The main focus of the global power management mechanism is to ensure correctness when undervoltage events are occurring. As mentioned above, the mechanism maybe fairly coarse-grain since the extent of the undervoltage event is not known, and so the control may be designed to ensure correctness for worst-case events.

The next fastest mechanism may be the PMP/power budget control mechanism (reference numeral 802). The PMP mechanism may be slower than the global mechanism, but may have a more nuanced, fine-grained control. The PMP mechanism may attempt to improve efficiency and performance by taking action to limit the engagement of the global power management mechanism. For example, as mentioned above, the PMP mechanism may include modifying power budgets for various components that implement power management based on a budget. In another embodiment, the PMP mechanism may include temporary modification of clock frequency and/or power supply voltage to one or more components.

Additionally, a third power management mechanism may be employed, CPU-based power control (reference numeral 804). The CPU-based power control mechanism may employ software executed by the processors 152, and thus may share execution time with the operating system and various applications. The CPU-based power control mechanism may examine many metrics, include the telemetry data in the telemetry table 702 but also various measures of performance in the system. The CPU-based power control mechanism may employ dynamic voltage and frequency control, reducing voltage and frequency settings (e.g., the "power state") in the PMGR 700 as a mechanism to mitigate the amount of power control mitigation engagement by the global power control circuit 130 and the PMP power control mechanism and returning the power state to its original setting as desired to increase performance. The CPU-based power control mechanism may reduce the power state, e.g., if the global and PMP-based mitigations would be reduced to an extent that the lower power state would result in higher overall performance/efficiency, even though the system is running more slowly. Generally, the CPU-based mechanism may employ system-wide analysis and power management.

The global mechanism may have a time scale on the order of tens to hundreds of nanoseconds; the PMP mechanism may have time windows on the order of hundreds of microseconds; and the CPU-based mechanism may have a time scale of hundreds of milliseconds. That is, the PMP mechanism may operate using time windows that one or more decimal orders of magnitude longer than the time scale of the global mechanism, and the CPU-based mechanism may have a time window that is one or more decimal orders of magnitude longer than the PMP mechanism. In an embodiment, the time window for the CPU-based mechanism may be an integer multiple of the time window for the PMP mechanism.

Figure 9:
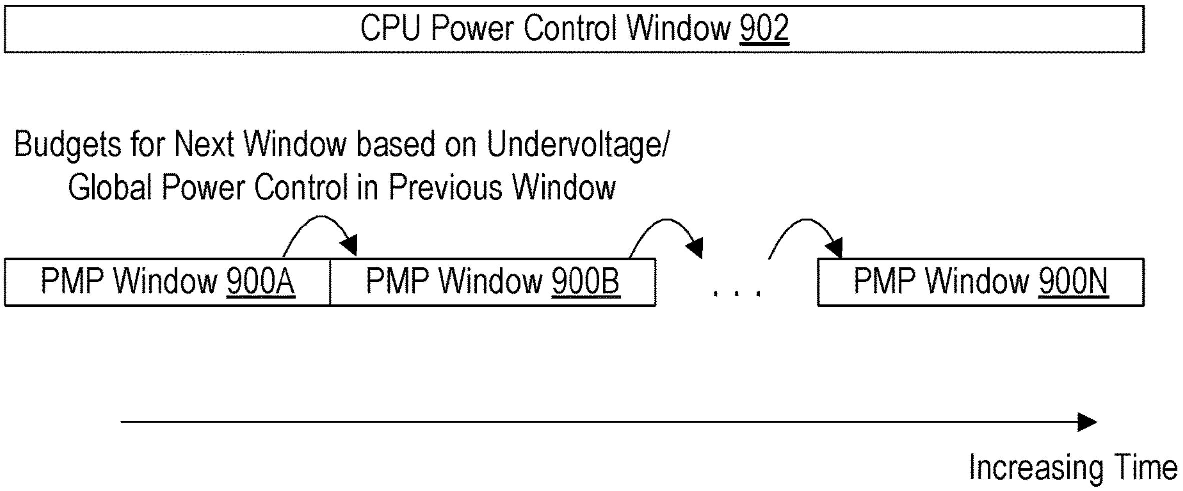
FIG. 9 is a timing diagram illustrating power control windows.

FIG. 9 illustrates an embodiment of power control windows implemented using the PMP-based power budget control (reference numerals 900A-900N) and the CPU power control window 902. Time increases from right to left in FIG. 9, in arbitrary units. As previously noted, the PMP-based mechanism may measure the undervoltage events and/or global power control activity in a given PMP window (e.g., window 900A) and modify the power budgets for one or more components in the next succeeding, or immediately adjacent, window (e.g., window 900B).

Figure 10:
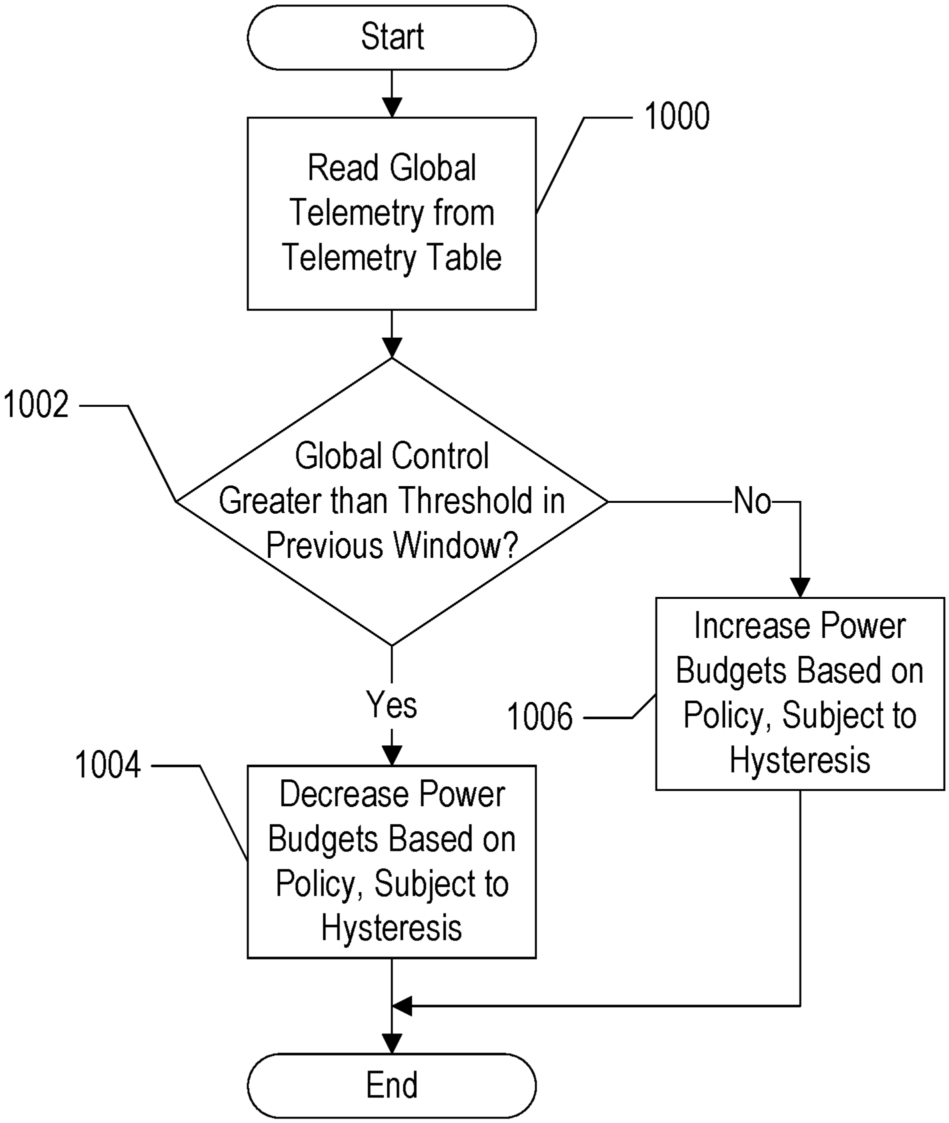
FIG. 10 is a flowchart illustrating operating one embodiment of a power management processor.

FIG. 10 is a flowchart illustrating operation of one embodiment of the PMP-based power budget control 710. While the blocks are shown in a particular order for case of understanding, other orders may be used. Blocks may be performed in parallel in combinatorial logic in hardware-based embodiments. Instructions executed by the PMP 704 for software-based embodiments may cause the PMP 704 to perform the specified operations. The operations in FIG. 10 may be performed, e.g., at or near the end of a given PMP time window 900A-900N in FIG. 9.

The power budget control may read the global telemetry from the telemetry table 702 (block 1000). Based on the telemetry data, the power budget control 710 may determine if the undervoltage events/trigger occurred greater than a desired threshold in the previous time window 900A-900N. For example, the threshold may be measured in terms of numbers of events, percentage of time that the global power control circuit 130 is engaging mitigation mechanism, etc. The threshold may be fixed or programmable, as desired.

If the events are occurring greater than the desired threshold (decision block 1002, "yes" leg), the power budget control 710 may decrease the power budgets for one or more components in the current window (block 1004). If not (decision block 1002, "no" leg), the power budget control 710 may increase the power budgets in the current window (block 1006). The increases and/or decreases may be subject to a certain amount of hysteresis. For example, if the most recent change was an increase in power budgets, a decrease in power budgets may be delayed until the decrease is indicated over two or more consecutive PMP time windows. Similarly, if the most recent change was a decrease in power budgets, an increase may be delayed until the increase is indicated over two or more consecutive PMP time windows.

It is noted that decreases in power budgets and increases in power budgets may be performed with different weights, or magnitudes. For example, the decreases applied from window to window may be larger than the increases applied from window to window. Thus, the power budgets would more rapidly be decreased if frequent undervoltage events are observed, in an attempt to quickly bring the more coarse-grained, correctness-based controls to a lower rate. Once the lower rate is achieved, slowing increasing the power budgets may allow the system to settle into a somewhat steady state.

Accordingly, in an embodiment, the at least one of the components of the integrated circuit may comprise one or more central processing unit (CPU) processors. The CPUs may be configured to execute a plurality of instructions to implement power control in the integrated circuit using dynamic voltage and frequency control. The plurality of instructions may implement power control over a second fixed time window that is greater than the fixed time window employed by the power management circuit. For example, the second fixed time window is one or more decimal orders of magnitude longer than the fixed time window. In an embodiment, the second fixed time window may be an integer multiple of the fixed time window. The power management circuit may be configured to: detect that the power control applied by the global power control circuit is less than the threshold; and increase the budgeted amount assigned to at least one of the plurality of components based on a detection that the power control applied by the global power control circuit exceeded the threshold. The increase of the budgeted amount may be limited to a maximum amount for the at least one of the plurality of components. The power management circuit may be configured to apply hysteresis when changing between an increase to the budget amount and a decrease to the budgeted amount. As mentioned previously, in an embodiment, the power management circuit may comprise a power management processor and a memory coupled to the power management processor storing a plurality of instructions, which, when executed by the power management processor, causes the power management processor to perform operations including operations described above for the power management circuit.

Example Methods

Figure 11:
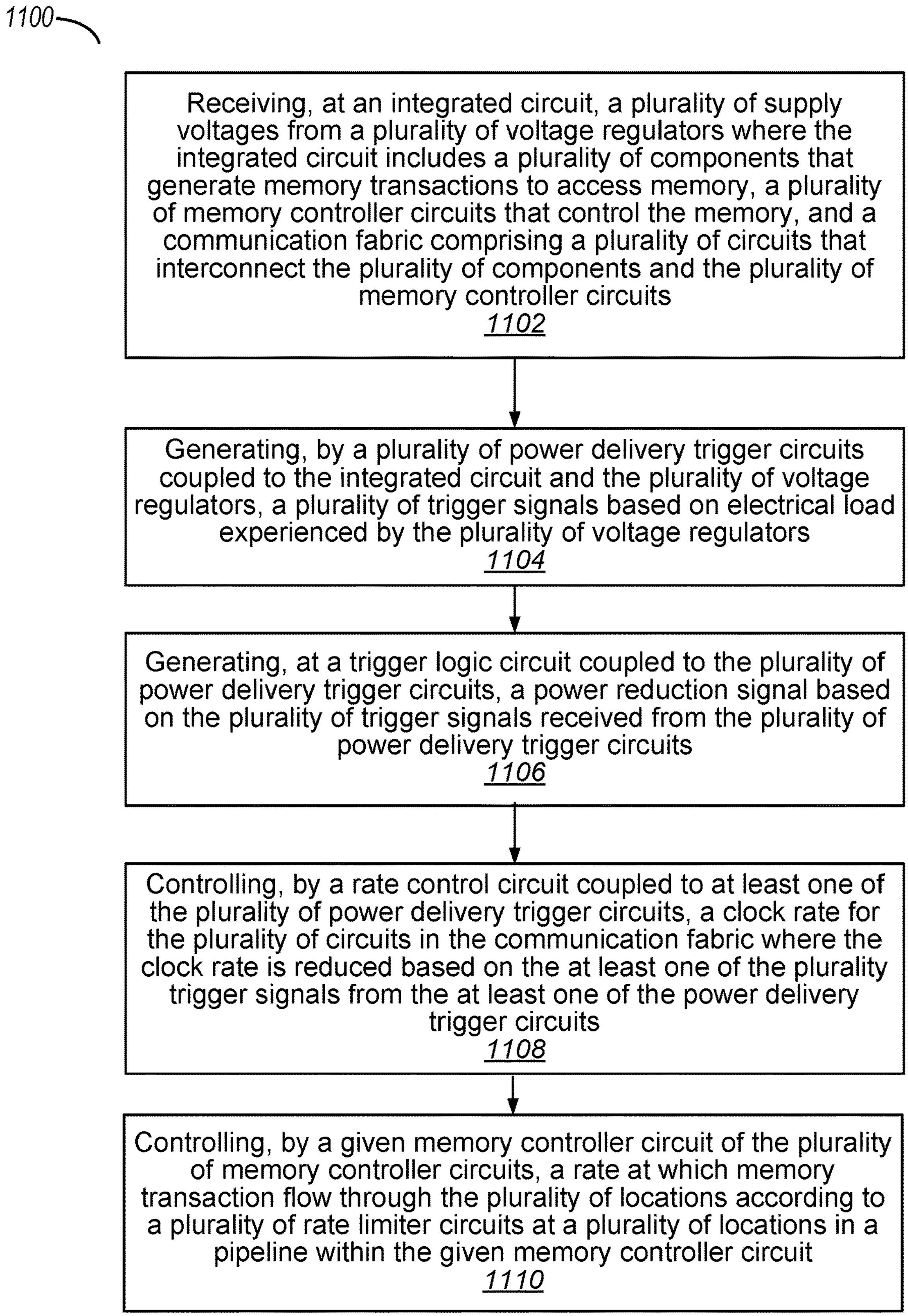
FIG. 11 is a flow diagram illustrating a method for power reduction in an integrated circuit, according to some embodiments.

FIG. 11 is a flow diagram illustrating a method for power reduction in an integrated circuit, according to some embodiments. Method 1100 may be implemented using any of the embodiments of an SOC as disclosed herein, in conjunction with any circuitry or other mechanism in an integrated circuit.

At 1102, in the illustrated embodiment, an integrated circuit receives a plurality of supply voltages from a plurality of voltage regulators where the integrated circuit includes a plurality of components that generate memory transactions to access memory, a plurality of memory controller circuits that control the memory, and a communication fabric comprising a plurality of circuits that interconnect the plurality of components and the plurality of memory controller circuits.

At 1104, in the illustrated embodiment, a plurality of power delivery trigger circuits coupled to the integrated circuit and the plurality of voltage regulators generate a plurality of trigger signals based on electrical load experienced by the plurality of voltage regulators.

At 1106, in the illustrated embodiment, a trigger logic circuit coupled to the plurality of power delivery trigger circuits generates a power reduction signal based on the plurality of trigger signals received from the plurality of power delivery trigger circuits.

At 1108, in the illustrated embodiment, a rate control circuit coupled to at least one of the plurality of power delivery trigger circuits controls a clock rate for the plurality of circuits in the communication fabric where the clock rate is reduced based on the at least one of the plurality trigger signals from the at least one of the power delivery trigger circuits.

At 1110, in the illustrated embodiment, a given memory controller circuit of the plurality of memory controller circuits controls a rate at which memory transaction flow through the plurality of locations according to a plurality of rate limiter circuits at a plurality of locations in a pipeline within the given memory controller circuit.

Figure 12:
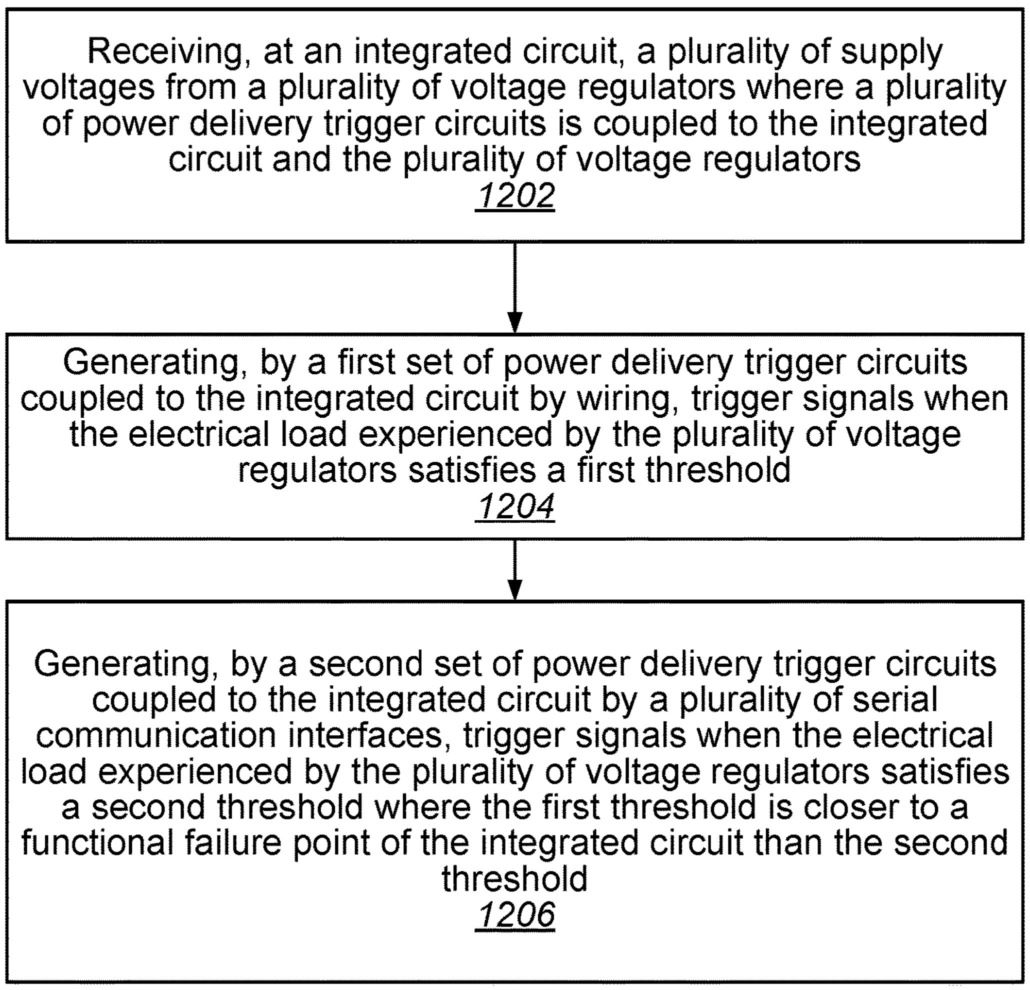
FIG. 12 is a flow diagram illustrating another method for power reduction in an integrated circuit, according to some embodiments

FIG. 12 is a flow diagram illustrating another method for power reduction in an integrated circuit, according to some embodiments. Method 1200 may be implemented using any of the embodiments of an SOC as disclosed herein, in conjunction with any circuitry or other mechanism in an integrated circuit.

At 1202, in the illustrated embodiment, an integrated circuit receives a plurality of supply voltages from a plurality of voltage regulators where a plurality of power delivery trigger circuits is coupled to the integrated circuit and the plurality of voltage regulators.

At 1204, in the illustrated embodiment, a first set of power delivery trigger circuits coupled to the integrated circuit by wiring generates trigger signals when the electrical load experienced by the plurality of voltage regulators satisfies a first threshold.

At 1206, in the illustrated embodiment, a second set of power delivery trigger circuits coupled to the integrated circuit by a plurality of serial communication interfaces generates trigger signals when the electrical load experienced by the plurality of voltage regulators satisfies a second threshold where the first threshold is closer to a functional failure point of the integrated circuit than the second threshold.

Example Power Delivery System

Figure 13:
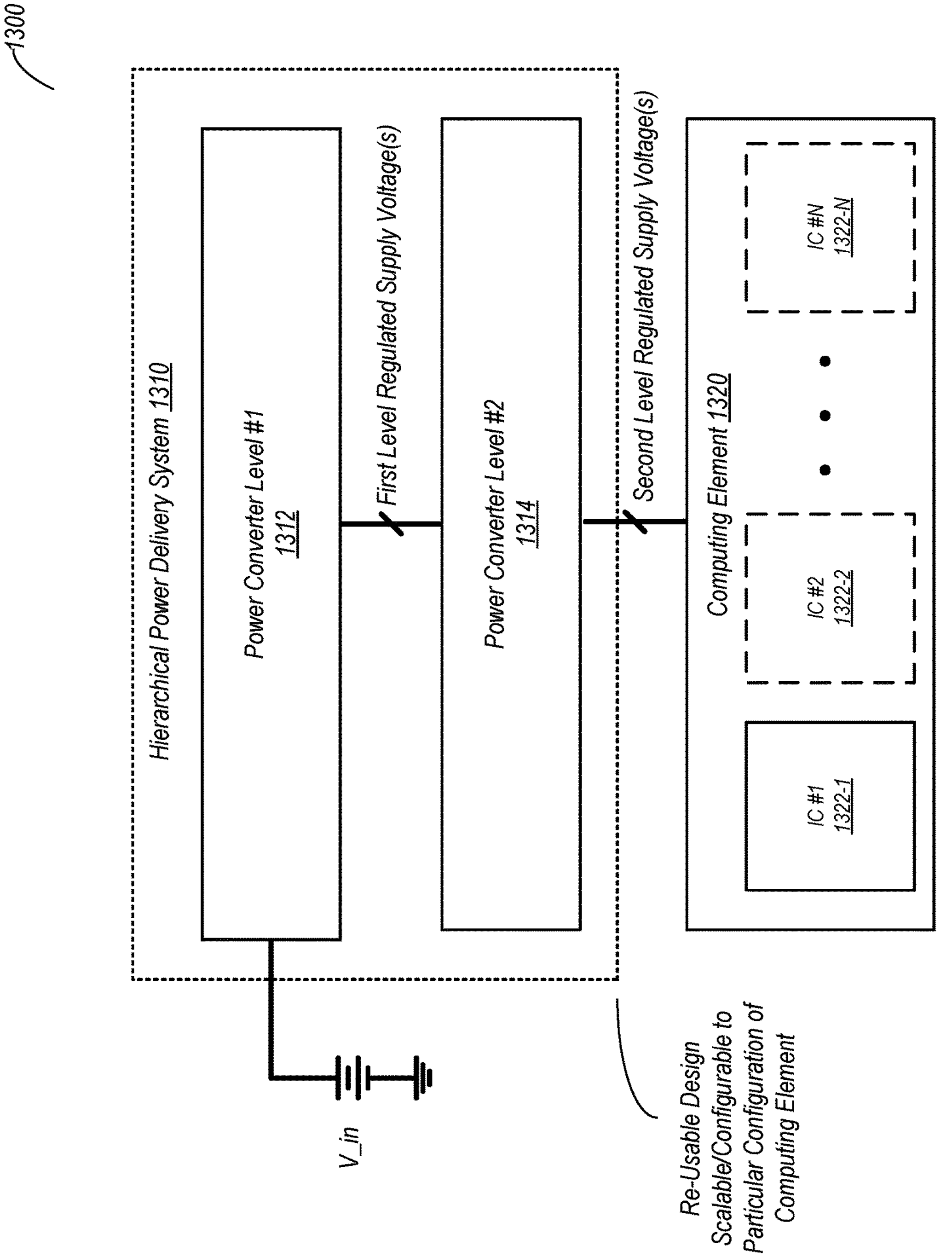
FIG. 13 is a block diagram of one embodiment of a power delivery system.

Turning now to FIG. 13, a block diagram of a system having a power delivery system and a computing element is shown. In the illustrated embodiment, system 1300 includes a hierarchical power delivery system 1310 and a computing element 1320. Hierarchical power delivery system 1310 includes a first power converter level 1312 that is coupled to receive an input voltage, V_in, from an external source, e.g., a battery. The first power converter level 1312 includes one or more power converters configured to generate one or more first level regulated supply voltages. These first level regulated supply voltages are received by one or more power converters of a second power converter level 1314. The power converters of power converter level 1314, using the one or more first level regulated supply voltages, generate one or more second level regulated supply voltages. These voltages are provided to the various loads of computing element 1320.

In the embodiment shown, computing element 1320 includes one or more integrated circuits (ICs or SOCs) 1322, shown here generally as ICs 1322-1 to 1322-N. Computing element 1320 is configurable and scalable, with the number of ICs varying from one implementation to the next. For example, in a first implementation, computing element 1320 may comprise a single IC die, whereas, in a second implementation, computing element 1320 may comprise two or more IC dies. Implementations in which only a portion of an IC die are enabled are also possible and contemplated.

While computing element 1320 is thus scalable, the number of ICs of a particular implementation is transparent to software executing thereon. Thus, irrespective of the number of particular ICs in a given implementation, the software executing thereon may see computing element 1320 as a single entity. Accordingly, computing element 1320 in the embodiment shown may implement a computing architecture that can be scaled up or down as desired, and capable of executing software on the various implementations without regard to this scaling.

Each IC 1322-1 to 1322-N in the embodiment shown may include a number of different types of circuits. For example, the ICs 1322-1 to 1322-N may include, various types of processor cores, graphics processing units (GPUs), neural network processors, memory controllers, input/output (I/O) circuits, network switches for implementing various networks thereon, and so forth. When two or more instances of IC 1322-1 to 1322-N are implemented to form a computing element, the various functional circuits thereon may form larger complexes than those of an implementation using a single IC or a portion thereof. For example, the ICs 1322-1 and 1322-N may each include a complex of processor cores, and thus in an implementation of computing element 1320 having two or more ICs, a larger complex of processor cores spanning across a number of ICs is realized. The processor cores of one IC may communicate with those of another through one or more die-to-die interfaces between the individual ICs.

Given the differing power requirements from the different types of circuitry implemented on an instance of IC 1322-1 to 1322-N, multiple power converters generating corresponding voltages to meet the efficiency requirements of these loads may thus be present. For example, processor cores may have different power requirements than I/O circuits. Accordingly, power converter level 1314 may include one or more power converters suitable for providing a first second level supply voltage to the processor cores, and one or more power converters providing a different second level supply voltage to the I/O circuits.

Hierarchical power delivery system 1310 in the embodiment shown is also scalable, mirroring the scalability of computing element 1320. In various embodiments, the power converter levels of hierarchical power delivery system 1310 may include a number of power converters (e.g., switching voltage regulators, and the like) to meet the electrical requirements of the various loads, as discussed above. The number of power converters that are enabled for a particular implementation may thus correspond to the number of ICs 1322-1 to 1322-N in the particular implementation of computing element 1320. More generally, power converters levels 1312 and 1314 may be arranged to enable more power supplying capacity as more computing capacity is implemented in computing element 1320. In this manner, the design of hierarchical power delivery system 1310 is re-usable for a number of different implementations of computing element 1320. The re-use of the design of hierarchical power delivery system 1310 across the range of scalability of computing element 1320 may in turn obviate the need to provide custom power delivery solutions for various different implementations. This in turn can significantly simplify the design of various systems based on varying implementations of computing element 1320, as well as reducing the amount of time to realize a working system for any particular implementation of such a design.

Figure 14:
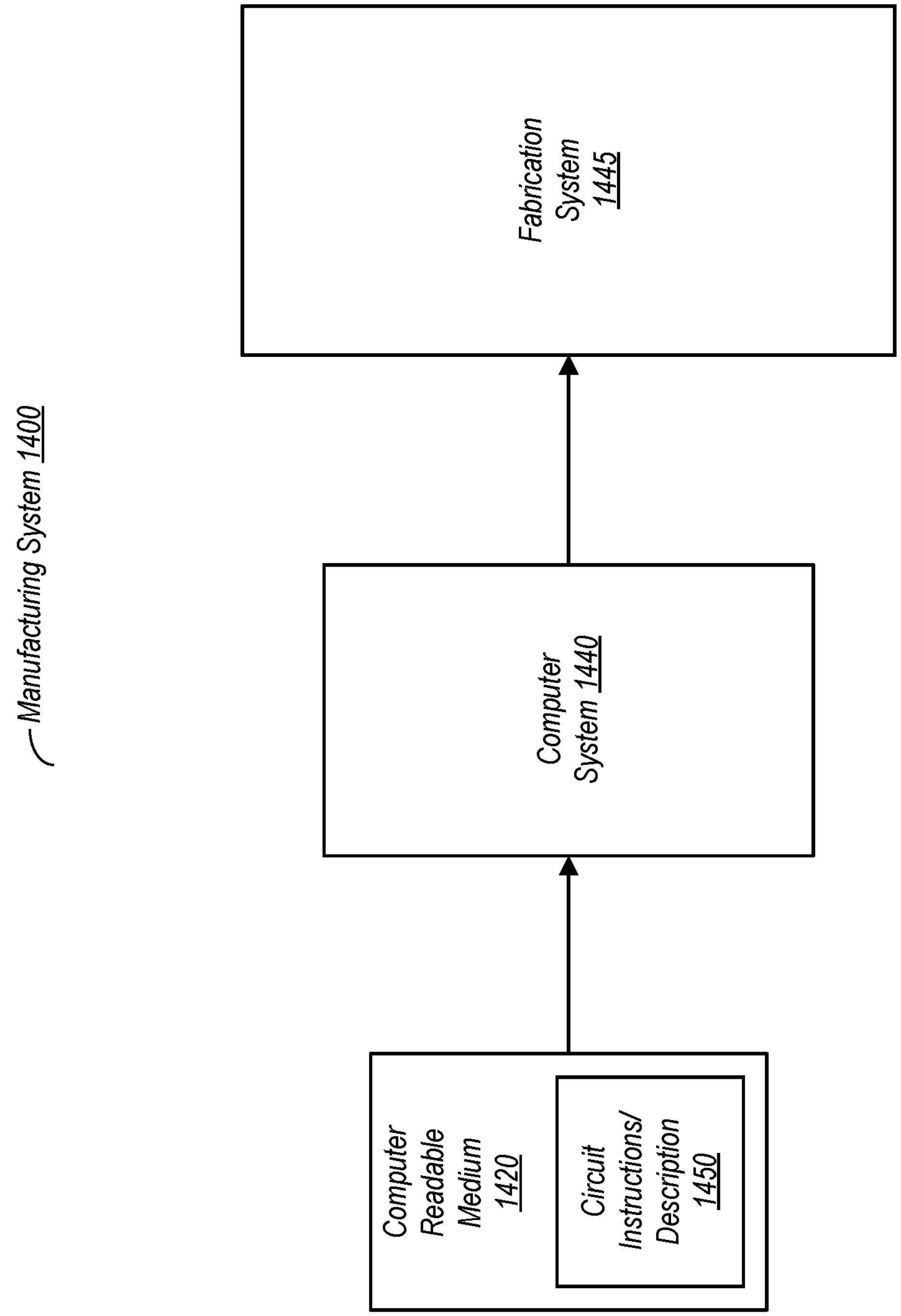
FIG. 14 is a block diagram illustrating one embodiment of a computer system, a computer readable medium, and a fabrication system.

Computer Readable Medium and Fabrication System:

FIG. 14 is a block diagram of one embodiment of a manufacturing system 1400. The system includes a non-transitory computer readable medium 1420 having stored thereon instructions/description 1450 of a power delivery system of any embodiment falling within the scope of this disclosure. The computer readable medium 1420 may be one of a number of different types of non-transitory media, including disk storage, solid state drive (e.g., using flash memory), optical storage (e.g., CD-ROM), various types of random access memory (RAM), and so on, that are capable of providing persistent storage of information.

A computer system 1440 is configured to read the circuit instructions/description 1450 from computer readable medium 1420. Furthermore, computer system 1440 may execute the various instructions and used the circuit description to cause fabrication system 1445 to manufacture one or more instances of the circuit represented by circuit instructions/description 1450. Fabrication system 1445 may be any type of automated system that can manufacture electronic circuits.

Example System

Figure 15:
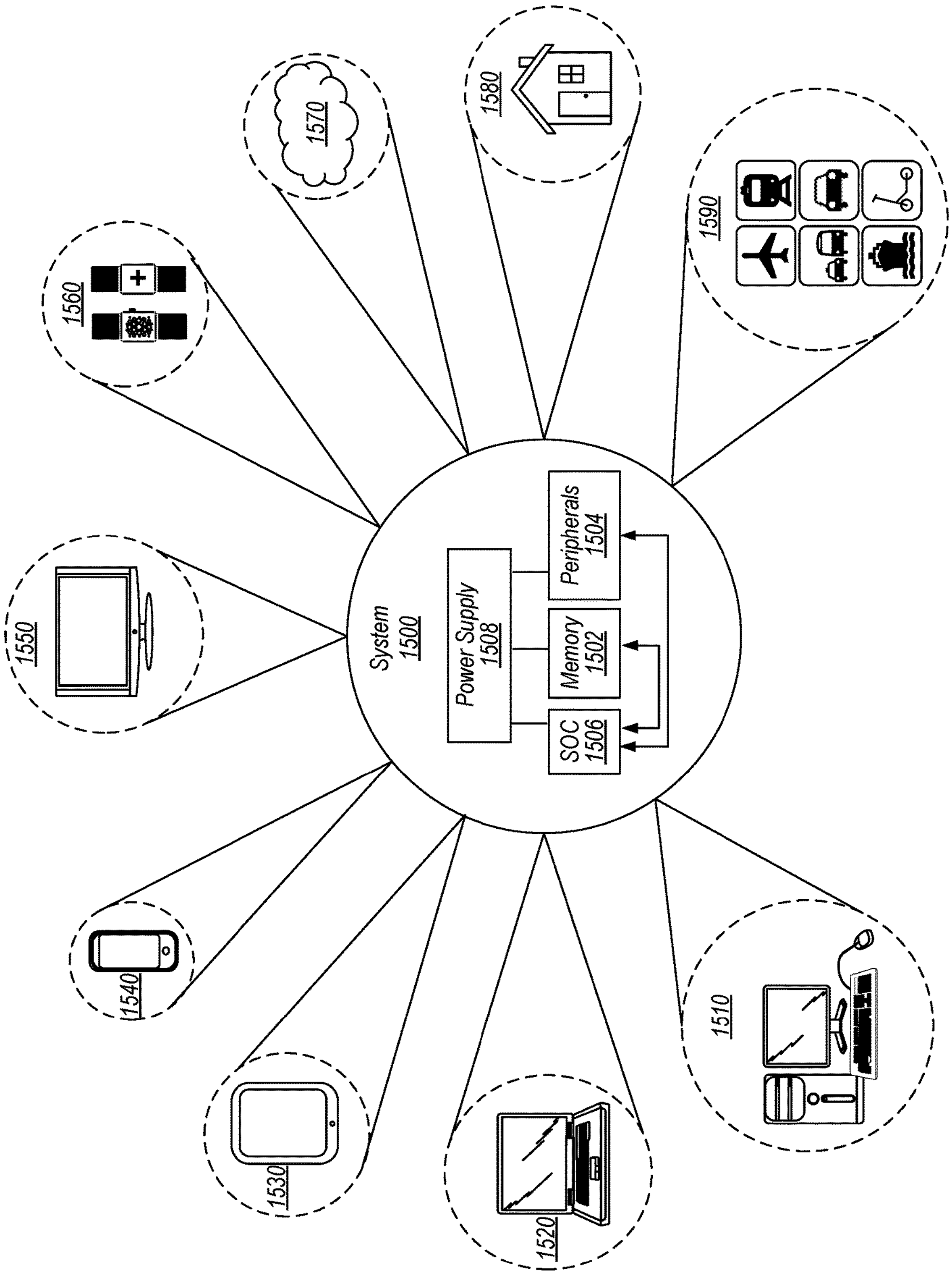
FIG. 15 is a block diagram of one embodiment of an example system.

Turning next to FIG. 15, a block diagram of one embodiment of a system 1500 is shown that may incorporate and/or otherwise utilize the methods and mechanisms described herein. In the illustrated embodiment, the system 1500 includes at least one instance of a system on chip (SoC) 1506 which may include multiple types of processing units, such as a central processing unit (CPU), a graphics processing unit (GPU), or otherwise, a communication fabric, and interfaces to memories and input/output devices. In some embodiments, one or more processors in SoC 1506 include multiple execution lanes and an instruction issue queue. In various embodiments, SoC 1506 is coupled to external memory 1502, peripherals 1504, and power supply 1508.

A power supply 1508 is also provided which supplies the supply voltages to SoC 1506 as well as one or more supply voltages to the memory 1502 and/or the peripherals 1504. In various embodiments, power supply 1508 represents a battery (e.g., a rechargeable battery in a smart phone, laptop or tablet computer, or other device). In some embodiments, more than one instance of SoC 1506 is included (and more than one external memory 1502 is included as well).

The memory 1502 is any type of memory, such as dynamic random access memory (DRAM), synchronous DRAM (SDRAM), double data rate (DDR, DDR2, DDR3, etc.) SDRAM (including mobile versions of the SDRAMs such as mDDR3, etc., and/or low power versions of the SDRAMs such as LPDDR2, etc.), RAMBUS DRAM (RDRAM), static RAM (SRAM), etc. One or more memory devices are coupled onto a circuit board to form memory modules such as single inline memory modules (SIMMs), dual inline memory modules (DIMMs), etc. Alternatively, the devices are mounted with a SoC or an integrated circuit in a chip-on-chip configuration, a package-on-package configuration, or a multi-chip module configuration.

The peripherals 1504 include any desired circuitry, depending on the type of system 1500. For example, in one embodiment, peripherals 1504 includes devices for various types of wireless communication, such as Wi-Fi, Bluetooth, cellular, global positioning system, etc. In some embodiments, the peripherals 1504 also include additional storage, including RAM storage, solid state storage, or disk storage. The peripherals 1504 include user interface devices such as a display screen, including touch display screens or multitouch display screens, keyboard or other input devices, microphones, speakers, etc.

As illustrated, system 1500 is shown to have application in a wide range of areas. For example, system 1500 may be utilized as part of the chips, circuitry, components, etc., of a desktop computer 1510, laptop computer 1520, tablet computer 1530, cellular or mobile phone 1540, or television 1550 (or set-top box coupled to a television). Also illustrated is a smartwatch and health monitoring device 1560. In some embodiments, smartwatch 1560 may include a variety of general-purpose computing related functions. For example, a smartwatch may provide access to email, cellphone service, a user calendar, and so on. In various embodiments, a health monitoring device may be a dedicated medical device or otherwise include dedicated health related functionality. For example, a health monitoring device may monitor a user's vital signs, track proximity of a user to other users for the purpose of epidemiological social distancing, contact tracing, provide communication to an emergency service in the event of a health crisis, and so on. In various embodiments, the above-mentioned smartwatch may or may not include some or any health monitoring related functions. Other wearable devices are contemplated as well, such as devices worn around the neck, devices that are implantable in the human body, glasses designed to provide an augmented and/or virtual reality experience, and so on.

System 1500 may further be used as part of a cloud-based service(s) 1570. For example, the previously mentioned devices, and/or other devices, may access computing resources in the cloud (i.e., remotely located hardware and/or software resources). Still further, system 1500 may be utilized in one or more devices of a home other than those previously mentioned. For example, appliances within the home may monitor and detect conditions that warrant attention. For example, various devices within the home (e.g., a refrigerator, a cooling system, etc.) may monitor the status of the device and provide an alert to the homeowner (or, for example, a repair facility) should a particular event be detected. Alternatively, a thermostat may monitor the temperature in the home and may automate adjustments to a heating/cooling system based on a history of responses to various conditions by the homeowner. Also illustrated in FIG. 15 is the application of system 1500 to various modes of transportation. For example, system 1500 may be used in the control and/or entertainment systems of aircraft, trains, buses, cars for hire, private automobiles, waterborne vessels from private boats to cruise liners, scooters (for rent or owned), and so on. In various cases, system 1500 may be used to provide automated guidance (e.g., self-driving vehicles), general systems control, and otherwise. These any many other embodiments are possible and are contemplated. It is noted that the devices and applications illustrated in FIG. 15 are illustrative only and are not intended to be limiting. Other devices are possible and are contemplated.

The present disclosure further contemplates the use of a common, scalable computing architecture among some or all of the various devices illustrated in FIG. 15. Thus, a computing element may be scaled according to the needs of the particular system in which it is implemented. For example, smartwatch/health monitoring device 1560 may use a first implementation of a computing element of a scalable architecture, while tablet computer 1530 uses a second implementation, and desktop computer 1510 uses a third implementation. In this particular example, the implementation of the computing element in tablet computer 1530 may be scaled up relative to smartwatch/health monitoring device 1560. Similarly, the implementation of the computing element in desktop computer 1510 may be scaled up relative to that of tablet computer 1530. Thus, each of these devices may utilize a common computing architecture that is implemented on a scale according to the needs of its respective system. In conjunction with the scalable architecture, a power delivery system in accordance with this disclosure may be provided in each of these applications and may be correspondingly scaled with the computing element. Thus, while each of the examples discussed here may utilize a power delivery system having a common design, the implementation for desktop computer 1510 may have more power delivery capacity than that of tablet computer 1530, which in turn has a greater power delivery capacity than that of smartwatch/health monitoring device 1560. However, the common design of the power delivery system used among these different devices may significantly simplify their implementation, as the power delivery system can be configured for the particular application by enabling/disabling appropriate ones of the power converters therein.

The present disclosure includes references to "an "embodiment" or groups of "embodiments" (e.g., "some embodiments" or "various embodiments"). Embodiments are different implementations or instances of the disclosed concepts. References to "an embodiment," "one embodiment," "a particular embodiment," and the like do not necessarily refer to the same embodiment. A large number of possible embodiments are contemplated, including those specifically disclosed, as well as modifications or alternatives that fall within the spirit or scope of the disclosure.

This disclosure may discuss potential advantages that may arise from the disclosed embodiments. Not all implementations of these embodiments will necessarily manifest any or all of the potential advantages. Whether an advantage is realized for a particular implementation depends on many factors, some of which are outside the scope of this disclosure. In fact, there are a number of reasons why an implementation that falls within the scope of the claims might not exhibit some or all of any disclosed advantages. For example, a particular implementation might include other circuitry outside the scope of the disclosure that, in conjunction with one of the disclosed embodiments, negates or diminishes one or more the disclosed advantages. Furthermore, suboptimal design execution of a particular implementation (e.g., implementation techniques or tools) could also negate or diminish disclosed advantages. Even assuming a skilled implementation, realization of advantages may still depend upon other factors such as the environmental circumstances in which the implementation is deployed. For example, inputs supplied to a particular implementation may prevent one or more problems addressed in this disclosure from arising on a particular occasion, with the result that the benefit of its solution may not be realized. Given the existence of possible factors external to this disclosure, it is expressly intended that any potential advantages described herein are not to be construed as claim limitations that must be met to demonstrate infringement. Rather, identification of such potential advantages is intended to illustrate the type(s) of improvement available to designers having the benefit of this disclosure. That such advantages are described permissively (e.g., stating that a particular advantage "may arise") is not intended to convey doubt about whether such advantages can in fact be realized, but rather to recognize the technical reality that realization of such advantages often depends on additional factors.

Unless stated otherwise, embodiments are non-limiting. That is, the disclosed embodiments are not intended to limit the scope of claims that are drafted based on this disclosure, even where only a single example is described with respect to a particular feature. The disclosed embodiments are intended to be illustrative rather than restrictive, absent any statements in the disclosure to the contrary. The application is thus intended to permit claims covering disclosed embodiments, as well as such alternatives, modifications, and equivalents that would be apparent to a person skilled in the art having the benefit of this disclosure.

For example, features in this application may be combined in any suitable manner. Accordingly, new claims may be formulated during prosecution of this application (or an application claiming priority thereto) to any such combination of features. In particular, with reference to the appended claims, features from dependent claims may be combined with those of other dependent claims where appropriate, including claims that depend from other independent claims. Similarly, features from respective independent claims may be combined where appropriate.

Accordingly, while the appended dependent claims may be drafted such that each depends on a single other claim, additional dependencies are also contemplated. Any combinations of features in the dependent claims that are consistent with this disclosure are contemplated and may be claimed in this or another application. In short, combinations are not limited to those specifically enumerated in the appended claims.

Where appropriate, it is also contemplated that claims drafted in one format or statutory type (e.g., apparatus) are intended to support corresponding claims of another format or statutory type (e.g., method).

Because this disclosure is a legal document, various terms and phrases may be subject to administrative and judicial interpretation. Public notice is hereby given that the following paragraphs, as well as definitions provided throughout the disclosure, are to be used in determining how to interpret claims that are drafted based on this disclosure.

References to a singular form of an item (i.e., a noun or noun phrase preceded by "a," "an," or "the") are, unless context clearly dictates otherwise, intended to mean "one or more." Reference to "an item" in a claim thus does not, without accompanying context, preclude additional instances of the item. A "plurality" of items refers to a set of two or more of the items.

The word "may" is used herein in a permissive sense (i.e., having the potential to, being able to) and not in a mandatory sense (i.e., must).

The terms "comprising" and "including," and forms thereof, are open-ended and mean "including, but not limited to."

When the term "or" is used in this disclosure with respect to a list of options, it will generally be understood to be used in the inclusive sense unless the context provides otherwise. Thus, a recitation of "x or y" is equivalent to "x or y, or both," and thus covers 1) x but not y, 2) y but not x, and 3) both x and y. On the other hand, a phrase such as "either x or y, but not both" makes clear that "or" is being used in the exclusive sense.

A recitation of "w, x, y, or z, or any combination thereof" or "at least one of . . . w, x, y, and z" is intended to cover all possibilities involving a single element up to the total number of elements in the set. For example, given the set [w, x, y, z], these phrasings cover any single element of the set (e.g., w but not x, y, or z), any two elements (e.g., w and x, but not y or z), any three elements (e.g., w, x, and y, but not z), and all four elements. The phrase "at least one of . . . w, x, y, and z" thus refers to at least one element of the set [w, x, y, z], thereby covering all possible combinations in this list of elements. This phrase is not to be interpreted to require that there is at least one instance of w, at least one instance of x, at least one instance of y, and at least one instance of z.

Various "labels" may precede nouns or noun phrases in this disclosure. Unless context provides otherwise, different labels used for a feature (e.g., "first circuit," "second circuit," "particular circuit," "given circuit," etc.) refer to different instances of the feature. Additionally, the labels "first," "second," and "third" when applied to a feature do not imply any type of ordering (e.g., spatial, temporal, logical, etc.), unless stated otherwise.

The phrase "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

The phrases "in response to" and "responsive to" describe one or more factors that trigger an effect. This phrase does not foreclose the possibility that additional factors may affect or otherwise trigger the effect, either jointly with the specified factors or independent from the specified factors. That is, an effect may be solely in response to those factors, or may be in response to the specified factors as well as other, unspecified factors. Consider the phrase "perform A in response to B." This phrase specifies that B is a factor that triggers the performance of A, or that triggers a particular result for A. This phrase does not foreclose that performing A may also be in response to some other factor, such as C. This phrase also does not foreclose that performing A may be jointly in response to B and C. This phrase is also intended to cover an embodiment in which A is performed solely in response to B. As used herein, the phrase "responsive to" is synonymous with the phrase "responsive at least in part to." Similarly, the phrase "in response to" is synonymous with the phrase "at least in part in response to."

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical). More specifically, this formulation is used to indicate that this structure is arranged to perform the one or more tasks during operation. A structure can be said to be "configured to" perform some tasks even if the structure is not currently being operated. Thus, an entity described or recited as being "configured to" perform some tasks refers to something physical, such as a device, circuit, a system having a processor unit and a memory storing program instructions executable to implement the task, etc. This phrase is not used herein to refer to something intangible.

In some cases, various units/circuits/components may be described herein as performing a set of tasks or operations. It is understood that those entities are "configured to" perform those tasks/operations, even if not specifically noted.

The term "configured to" is not intended to mean "configurable to." An unprogrammed FPGA, for example, would not be considered to be "configured to" perform a particular function. This unprogrammed FPGA may be "configurable to" perform that function, however. After appropriate programming, the FPGA may then be said to be "configured to" perform the particular function.

For purposes of United States patent applications based on this disclosure, reciting in a claim that a structure is "configured to" perform one or more tasks is expressly intended not to invoke 35 U.S.C. § 112(f) for that claim element. Should Applicant wish to invoke Section 112(f) during prosecution of a United States patent application based on this disclosure, it will recite claim elements using the "means for" [performing a function] construct.

Different "circuits" may be described in this disclosure. These circuits or "circuitry" constitute hardware that includes various types of circuit elements, such as combinatorial logic, clocked storage devices (e.g., flip-flops, registers, latches, etc.), finite state machines, memory (e.g., random-access memory, embedded dynamic random-access memory), programmable logic arrays, and so on. Circuitry may be custom designed, or taken from standard libraries. In various implementations, circuitry can, as appropriate, include digital components, analog components, or a combination of both. Certain types of circuits may be commonly referred to as "units" (e.g., a decode unit, an arithmetic logic unit (ALU), functional unit, memory management unit (MMU), etc.). Such units also refer to circuits or circuitry.

The disclosed circuits/units/components and other elements illustrated in the drawings and described herein thus include hardware elements such as those described in the preceding paragraph. In many instances, the internal arrangement of hardware elements within a particular circuit may be specified by describing the function of that circuit. For example, a particular "decode unit" may be described as performing the function of "processing an opcode of an instruction and routing that instruction to one or more of a plurality of functional units," which means that the decode unit is "configured to" perform this function. This specification of function is sufficient, to those skilled in the computer arts, to connote a set of possible structures for the circuit.

In various embodiments, as discussed in the preceding paragraph, circuits, units, and other elements may be defined by the functions or operations that they are configured to implement. The arrangement and such circuits/units/components with respect to each other and the manner in which they interact form a microarchitectural definition of the hardware that is ultimately manufactured in an integrated circuit or programmed into an FPGA to form a physical implementation of the microarchitectural definition. Thus, the microarchitectural definition is recognized by those of skill in the art as structure from which many physical implementations may be derived, all of which fall into the broader structure described by the microarchitectural definition. That is, a skilled artisan presented with the microarchitectural definition supplied in accordance with this disclosure may, without undue experimentation and with the application of ordinary skill, implement the structure by coding the description of the circuits/units/components in a hardware description language (HDL) such as Verilog or VHDL. The HDL description is often expressed in a fashion that may appear to be functional. But to those of skill in the art in this field, this HDL description is the manner that is used to transform the structure of a circuit, unit, or component to the next level of implementational detail. Such an HDL description may take the form of behavioral code (which is typically not synthesizable), register transfer language (RTL) code (which, in contrast to behavioral code, is typically synthesizable), or structural code (e.g., a netlist specifying logic gates and their connectivity). The HDL description may subsequently be synthesized against a library of cells designed for a given integrated circuit fabrication technology, and may be modified for timing, power, and other reasons to result in a final design database that is transmitted to a foundry to generate masks and ultimately produce the integrated circuit. Some hardware circuits or portions thereof may also be custom-designed in a schematic editor and captured into the integrated circuit design along with synthesized circuitry. The integrated circuits may include transistors and other circuit elements (e.g., passive elements such as capacitors, resistors, inductors, etc.) and interconnect between the transistors and circuit elements. Some embodiments may implement multiple integrated circuits coupled together to implement the hardware circuits, and/or discrete elements may be used in some embodiments. Alternatively, the HDL design may be synthesized to a programmable logic array such as a field programmable gate array (FPGA) and may be implemented in the FPGA. This decoupling between the design of a group of circuits and the subsequent low-level implementation of these circuits commonly results in the scenario in which the circuit or logic designer never specifies a particular set of structures for the low-level implementation beyond a description of what the circuit is configured to do, as this process is performed at a different stage of the circuit implementation process.

The fact that many different low-level combinations of circuit elements may be used to implement the same specification of a circuit results in a large number of equivalent structures for that circuit. As noted, these low-level circuit implementations may vary according to changes in the fabrication technology, the foundry selected to manufacture the integrated circuit, the library of cells provided for a particular project, etc. In many cases, the choices made by different design tools or methodologies to produce these different implementations may be arbitrary.

Moreover, it is common for a single implementation of a particular functional specification of a circuit to include, for a given embodiment, a large number of devices (e.g., millions of transistors). Accordingly, the sheer volume of this information makes it impractical to provide a full recitation of the low-level structure used to implement a single embodiment, let alone the vast array of equivalent possible implementations. For this reason, the present disclosure describes structure of circuits using the functional shorthand commonly employed in the industry.

Numerous variations and modifications will become apparent to those skilled in the art once the above disclosure is fully appreciated. It is intended that the following claims be interpreted to embrace all such variations and modifications.

What is claimed is:

1. An integrated circuit, comprising:

a plurality of components, wherein a given component of the plurality of components is configured to manage power consumption based on a budgeted amount assigned to the given component;

a trigger logic circuit configured to generate a power reduction signal based on receiving trigger signals input to the integrated circuit, wherein the power reduction signal is synchronous with a clock cycle of the integrated circuit, and wherein the power reduction signal applies power control across the plurality of components;

a rate control circuit configured to control a clock rate for the plurality of components responsive to at least one of the trigger signals, wherein the rate control circuit reduces the clock rate asynchronously from the clock cycle; and a power management circuit configured to control the budgeted amount assigned to the given component based on assessment of the power control applied by the power reduction signal against a threshold.

2. The integrated circuit as recited in claim 1, wherein at least one of the plurality of components is a communication fabric that interconnects the rate control circuit and one or more additional components in the plurality of components, and wherein the rate control circuit is configured to control the clock rate for the communication fabric responsive to the at least one of the trigger signals.

3. The integrated circuit as recited in claim 1, wherein the rate control circuit is configured to reduce the clock rate responsive to the at least one of the trigger signals.

4. The integrated circuit as recited in claim 1, wherein the power management circuit is configured to control the budgeted amount assigned to at least one of the plurality of components by:

detecting whether or not the power control applied by the power reduction signal exceeds the threshold; and reducing the budgeted amount assigned to the at least one of the plurality of components based on the power control applied by the power reduction signal exceeding the threshold.

5. The integrated circuit as recited in claim 4, wherein power management circuit is configured to control the budgeted amount assigned to at least one of the plurality of components by:

detecting that the power control applied by the power reduction signal is less than the threshold; and increasing the budgeted amount assigned to the at least one of the plurality of components based on the detection that the power control applied by the power reduction signal is less than the threshold.

6. The integrated circuit as recited in claim 1, wherein total power consumption in the integrated circuit is controlled based on the power control applied by the power reduction signal.

7. The integrated circuit as recited in claim 1, wherein at least one of the plurality of components comprises one or more central processing unit (CPU) processors, and wherein the rate control circuit is configured to reduce the clock rate based on receiving the power reduction signal being provided to the one or more CPU processors.

8. The integrated circuit as recited in claim 1, wherein the threshold comprises a percentage of time that the power control is applied by the power reduction signal.

9. The integrated circuit as recited in claim 1, wherein at least one of the components comprises one or more central processing unit (CPU) processors, and wherein the one or more CPU processors are configured to execute a plurality of instructions to implement power control in the integrated circuit using dynamic voltage and frequency control.

10. The integrated circuit as recited in claim 1, wherein the plurality of components comprise one or more of the following: central processing unit (CPU) processors, graphics processing units (GPUs), and peripheral components.

11. A system comprising:

an integrated circuit; and a power management unit coupled to the integrated circuit, wherein the power management unit is configured to supply power to the integrated circuit and to generate trigger signals;

wherein the integrated circuit comprises:

a plurality of components, wherein a given component of the plurality of components is configured to manage power consumption based on a budgeted amount assigned to the given component;

a trigger logic circuit configured to generate a power reduction signal based on receiving the trigger signals from the power management unit, wherein the power reduction signal applies power control across the plurality of components, and wherein the trigger logic circuit is configured to provide the power reduction signal to at least one additional integrated circuit;

a rate control circuit configured to control a clock rate for the plurality of components responsive to at least one of the trigger signals; and a power management circuit configured to control the budgeted amount assigned to at least one of the plurality of components based on assessment of the power control applied by the power reduction signal against a threshold, wherein the at least one of the plurality of components is configured to manage its power consumption based on the budgeted amount assigned.

12. The system as recited in claim 11, wherein the power management unit includes:

a plurality of voltage regulators configured to supply a plurality of supply voltages to the integrated circuit; and one or more power delivery trigger circuits coupled to the integrated circuit and the plurality of voltage regulators, wherein the power delivery trigger circuits are configured to monitor the plurality of voltage regulators and generate the trigger signals based on electrical load experienced by the plurality of voltage regulators.

13. The system as recited in claim 11, wherein the power management circuit is configured to control the budgeted amount assigned to at least one of the plurality of components by:

detecting whether or not the power control applied by the power reduction signal exceeds the threshold; and reducing the budgeted amount assigned to the at least one of the plurality of components based on the power control applied by the power reduction signal exceeding the threshold.

14. The system as recited in claim 13, wherein the power management circuit is configured to control the budgeted amount assigned to at least one of the plurality of components by:

detecting that the power control applied by the power reduction signal is less than the threshold; and increasing the budgeted amount assigned to the at least one of the plurality of components based on a detection that the power control applied by the power reduction signal is less than the threshold.

15. The system as recited in claim 14, wherein the increase of the budgeted amount is limited to a maximum amount for the at least one of the plurality of components.

16. The system as recited in claim 11, wherein the plurality of components include one or more memory controller circuits configured to control memory, the system further comprising a plurality of rate limiter circuits at a plurality of locations in a pipeline within a given memory controller circuit, wherein the plurality of rate limiter circuits is configured to limit a rate at which memory transaction flow through the plurality of locations.

17. A system comprising:

an integrated circuit; and a power management unit coupled to the integrated circuit, wherein the power management unit is configured to supply power to the integrated circuit and to generate a trigger input;

wherein the integrated circuit comprises:

a plurality of components, wherein a given component of the plurality of components is configured to manage power consumption based on a budgeted amount assigned to the given component, and wherein the plurality of components includes at least one memory controller circuit configured to control memory;

a trigger logic circuit configured to generate a power reduction signal based on receiving the trigger input from the power management unit, and wherein the power reduction signal applies power control across the plurality of components;

a plurality of rate limiter circuits at a plurality of locations in a pipeline within the at least one memory controller circuit, and wherein one or more of the plurality of rate limiter circuits is configured to limit a rate at which memory transactions flow through the plurality of locations; and a power management circuit configured to control the budgeted amount assigned to at least one of the plurality of components based on assessment of the power control applied by the power reduction signal against a threshold, wherein the at least one of the plurality of components is configured to manage its power consumption based on the budgeted amount assigned.

18. The system as recited in claim 17, wherein at least one of the rate limiter circuits is located at one or more of: an arbitration point in the pipeline, a write memory arbiter in the pipeline, a read memory arbiter in the pipeline, a buffer in the pipeline, and between a memory arbiter and a memory cache in the pipeline.

19. The system as recited in claim 17, wherein at least one of the plurality of components is a communication fabric that interconnects a rate control circuit and one or more additional components in the plurality of components, and wherein the rate control circuit is configured to control the clock rate for the communication fabric responsive to the trigger input.

20. The system as recited in claim 17, wherein the plurality of components comprise one or more of the following: central processing unit (CPU) processors, graphics processing units (GPUs), and peripheral components.

* * * * *